United States Patent
Luo

(10) Patent No.: US 11,656,702 B2
(45) Date of Patent: May 23, 2023

(54) DISPLAY ASSEMBLY AND METHOD OF MANUFACTURING THE SAME, AND DISPLAY APPARATUS

(71) Applicant: BOE TECHNOLOGY GROUP CO., LTD., Beijing (CN)

(72) Inventor: Xiaofei Luo, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/389,943

(22) Filed: Jul. 30, 2021

(65) Prior Publication Data

US 2022/0050543 A1    Feb. 17, 2022

(30) Foreign Application Priority Data

Aug. 13, 2020  (CN) .......................... 202010814101.8

(51) Int. Cl.
*G06F 3/041* (2006.01)
*G09F 9/30* (2006.01)

(52) U.S. Cl.
CPC ............ *G06F 3/0412* (2013.01); *G09F 9/301* (2013.01); *G06F 2203/04102* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 9,298,322 B2* | 3/2016 | Chan ....................... | G06F 3/044 |
| 2019/0047900 A1* | 2/2019 | Hu ........................ | G06F 1/1652 |
| 2020/0089277 A1* | 3/2020 | Park .................... | H01L 51/0097 |

* cited by examiner

*Primary Examiner* — Brian M Butcher
(74) *Attorney, Agent, or Firm* — Dority & Manning, P.A.

(57) ABSTRACT

A display assembly includes a flexible display panel, a cover plate, and first and second support layers. The panel includes a main portion with display surface, and a bending portion. The bending portion includes a first straight sub-portion connected to the main portion, an arched sub-portion, and a second straight sub-portion located at a surface of the main portion facing away from the display surface. The cover plate is disposed above the main portion and the first straight sub-portion. The first support layer is located between the first and second straight sub-portions, between the main portion and the second straight sub-portion, and connected to the second straight sub-portion. The second support layer is disposed between the first straight sub-portion and the cover plate, and configured to support the first straight sub-portion. An orthogonal projection of the second support layer overlaps with an orthogonal projection of the first support layer.

18 Claims, 16 Drawing Sheets

DISPLAY ASSEMBLY AND METHOD OF MANUFACTURING THE SAME, AND DISPLAY APPARATUS

CROSS-REFERENCE TO RELATED APPLICATION

This application claims priority to Chinese Patent Application No. 202010814101.8, filed on, Aug. 13, 2020, which is incorporated herein by reference in its entirety.

TECHNICAL FIELD

The present disclosure relates to the field of display technologies, and in particular, to a display assembly and a method of manufacturing the same, and a display apparatus.

BACKGROUND

With development of display technologies, users' requirements for a dimension of a bottom bezel of a display apparatus such as a mobile phone are more and more higher. A small dimension of the bottom bezel enables the display apparatus to have a large screen-to-body ratio, so that users may obtain good visual experience.

SUMMARY

In an aspect, a display assembly is provided. The display assembly includes a flexible display panel, a cover plate, a first support layer and a second support layer. The flexible display panel includes a main portion with a display surface and a bending portion bent toward a surface of the main portion facing away from the display surface. The bending portion includes a first straight sub-portion, an arched sub-portion and a second straight sub-portion that are sequentially connected in an extending direction of the bending portion. The first straight sub-portion is further connected to the main portion, and the second straight sub-portion is located at the surface of the main portion facing away from the display surface. The cover plate is disposed above the main portion and the first straight sub-portion. The first support layer is located between the first straight sub-portion and the second straight sub-portion, and between the main portion and the second straight sub-portion, and is connected to the second straight sub-portion. The second support layer is disposed between the first straight sub-portion and the cover plate. An orthogonal projection of the second support layer on the cover plate overlaps with an orthogonal projection of the first support layer on the cover plate, and the second support layer is configured to support the first straight sub-portion.

In some embodiments, the second support layer is connected to the cover plate and is in direct contact with the first straight sub-portion.

In some embodiments, the display assembly further includes an adhesive layer disposed at least on a surface of the arched sub-part facing away from the first support layer.

In some embodiments, the adhesive layer is further disposed on a surface of the first straight sub-portion facing the second support layer. The second support layer is connected to the cover plate and is in direct contact with the adhesive layer.

In some embodiments, the second support layer is made of an elastic material or a rigid material.

In some embodiments, the second support layer is made of the elastic material including polyethylene terephthalate or rubber.

In some embodiments, the second support layer is made of the rigid material including metal.

In some embodiments, the arched sub-portion has surfaces perpendicular to a thickness thereof, and a first side surface and a second side surface connected to the surfaces and opposite to each other. A dimension of the second support layer is approximately equal to a dimension of the bending portion in a direction from the first side surface to the second side surface.

In some embodiments, the display assembly further includes a first backfilm and a second backfilm. The first backfilm is disposed on surfaces of the main portion and the first straight sub-portion facing the first support layer, and the second backfilm is disposed on a surface of the second straight sub-portion facing the first support layer. The first backfilm is closer to the arched sub-portion than the second backfilm in a direction from the first support layer to the arched sub-portion.

In some embodiments, a distance between an orthogonal projection of an edge of the first backfilm proximate to the arched sub-portion on the cover plate and an orthogonal projection of an edge of the second backfilm proximate to the arched sub-portion on the cover plate is in a range of 30 μm to 90 μm.

In some embodiments, an orthogonal projection of the edge of the second backfilm proximate to the arched sub-portion on the cover plate is located within a range of an orthogonal projection of the second support layer on the cover plate.

In some embodiments, the display assembly further includes a third support layer disposed at least between the main portion and the first support layer.

In some embodiments, the third support layer is made of metal.

In some embodiments, the display assembly further includes an optical sheet group. The optical sheet group is disposed between the main portion and the cover plate, and a thickness of the optical sheet group is greater than or equal to a thickness of the second support layer.

In some embodiments, the display assembly further includes a circuit board, a touch function layer, and a flexible circuit board. The circuit board is connected to the second straight sub-portion and is located on the surface of the main portion facing away from the display surface. The touch function layer is disposed between the main portion and the cover plate. One end of the flexible circuit board is connected to a portion of the touch function layer proximate to the second support layer, and another end of the flexible circuit board is located on a side of the second straight sub-portion away from the main portion and is connected to the circuit board. An orthogonal projection of the second support layer on a reference plane is non-overlapping with an orthogonal projection of the flexible circuit board on the reference plane, the reference plane is a plane perpendicular to a plane where the main portion is located.

In another aspect, a display apparatus is provided. The display apparatus includes a housing with an opening, and the display assembly according to any one of the above embodiments. The cover plate is disposed at the opening of the housing located, and the flexible display panel is disposed in the housing.

In yet another aspect, a method of manufacturing the display assembly is provided. The method includes: providing a flexible display panel to be processed; the flexible display panel to be processed including the main portion and a bendable portion; the bendable portion including the first straight sub-portion, a middle sub-portion and the second straight sub-portion that being sequentially connected, and the first straight sub-portion being further connected to the main portion; providing the second support layer on a surface of the first straight sub-portion directly connected to the display surface; providing the cover plate above the display surface of the main portion and a surface of the second support layer facing away from the first straight sub-portion; providing the first support layer on the surfaces of the main portion and the first straight sub-portion facing away from the display surface; bending the bendable portion toward the surface of the main portion facing away from the display surface, so that the middle sub-portion forms the arched sub-portion, and the second straight sub-portion being located on the surface of the main portion facing away from the display surface and being opposite to the first support layer; pressing the second straight sub-portion onto the first support layer; so that the second straight sub-portion being connected to the first support layer.

In some embodiments, before bending the bendable portion toward the surface of the main portion facing away from the display surface, the method further includes: providing a first backfilm on surfaces of the main portion and the first straight sub-portion facing the first support layer; and providing a second backfilm on a surface of the second straight sub-portion facing the first support layer. The first backfilm is closer to the arched portion than the second backfilm in a direction from the first support layer to the arched portion after bending the bendable portion toward the surface of the main portion facing away from the display surface.

In some embodiments, before bending the bendable portion toward the surface facing away from the display surface of the main portion, the method further includes: coating a surface of the middle sub-portion with adhesive to form an adhesive layer.

In some embodiments, before providing the first support layer on the surfaces of the main portion and the first straight sub-portion facing away from the display surface, the method further includes: providing a third support layer at least at the surface of the main portion facing away from the display surface.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, and an actual process of a method involved in the embodiments of the present disclosure.

DETAILED DESCRIPTION

Figure 1:
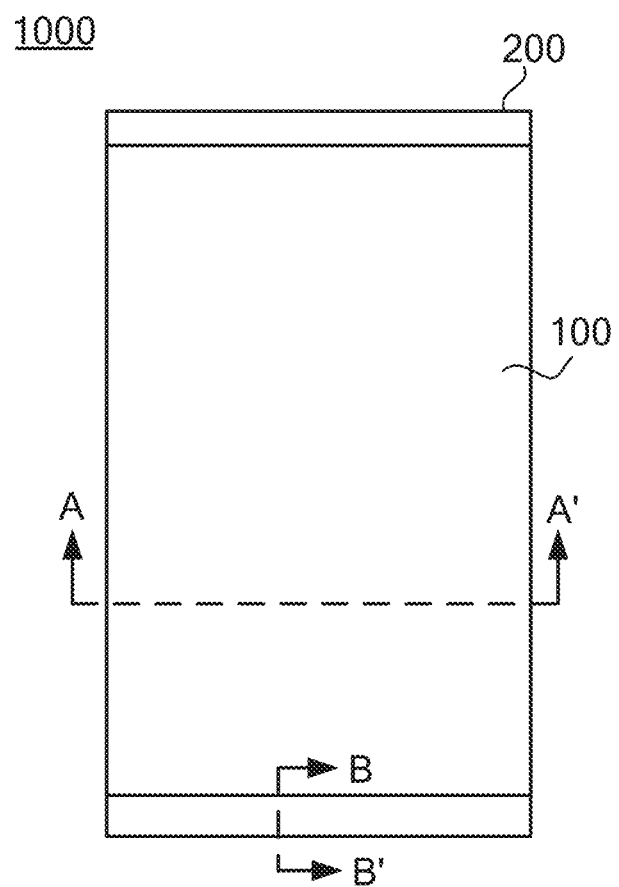
FIG. 1 is a schematic diagram showing a structure of a display apparatus, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Below, the terms "first", "second" and the like used in the present disclosure are not intended to mean any order, quantity or importance, but are merely used to distinguish different components. Thus, a feature defined with "first", "second" or the like may explicitly or implicitly include one or more of the features. As used in this description and the appended claims, the singular forms "a/an" and "the" may also include plural referents unless the content clearly dictates otherwise. In the description of the embodiments of the present disclosure, the term "a/the plurality of" means two or more unless otherwise specified.

Some embodiments may be described using the expression "connect" and derivatives thereof are not limited to physical or mechanical connections, but may include electrical connections, whether direct or indirect. The term "front", "rear", "on", "under", "left", "right", "top", "bottom" or the like is only used to indicate a relative positional relationship, and when the absolute position of a described object is changed, the relative positional relationship may also be changed accordingly.

When an element such as a layer, film, region, or substrate is referred to as being "on" or "under" another element, the element may be "directly" "on" or "under" the another element, or there may be intermediate element(s).

The use of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

Terms such as "about", "substantially" or "approximately" as used herein includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Exemplary embodiments are described herein with reference to sectional views and/or plan views as idealized exemplary drawings. In the accompanying drawings, thicknesses of layers and regions are enlarged for clarity. Exemplary embodiments of the present disclosure should not be construed to be limited to shapes of regions shown herein, but to include deviations in shape due to, for example, manufacture. For example, an etched region shown as a rectangle generally has a curved feature. Therefore, the regions shown in the accompanying drawings are schematic in nature, and their shapes are not intended to show actual shapes of the region in a device, and are not intended to limit the scope of the exemplary embodiments.

Some embodiments of the present disclosure provide a display apparatus, the display apparatus may serve as any display apparatus having a flexible display panel such as a television, a mobile phone, a tablet computer, a notebook computer, a digital photo frame or a navigator, the embodiments of the present disclosure do not limit thereto.

A structure of the display apparatus will be described below by taking a mobile phone as an example, and other types of display apparatuses may be provided by referring to the structure of the mobile phone in the embodiments.

Figure 2:
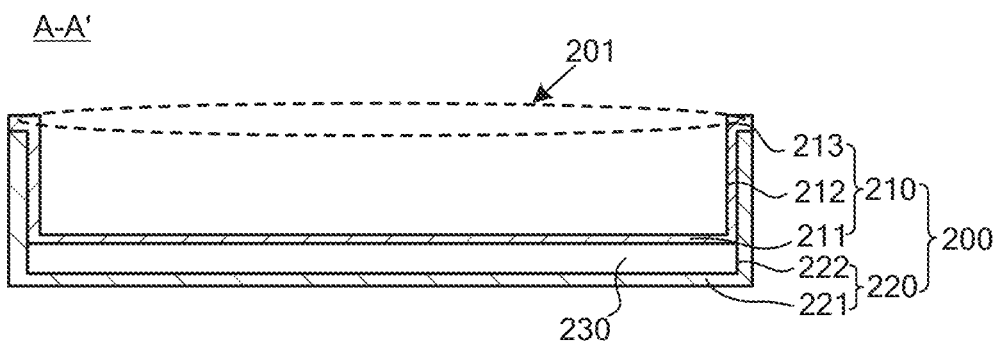
FIG. 2 is a sectional view of a housing in the display apparatus in FIG. 1 taken along the line A-A'.

As shown in FIGS. 1 and 2, the display apparatus 1000 includes a housing 200 with an opening 201 and a display assembly 100 disposed in the housing 200. Herein, for the convenience of illustration, the display assembly 100 is not shown in FIG. 2.

As shown in FIG. 2, the housing 200 includes a front housing 210 and a rear housing 220. The front housing 210 includes a front-housing bottom wall 211 and front-housing side walls 212 connected to the front-housing bottom wall 211. A flange 213 extending outside the front housing 210 is disposed on a side of each front-housing side wall 212 away from the front-housing bottom wall 211, and flanges 213 of the front-housing side walls 212 are connected in sequence to form the opening 201 of the housing 200. The rear housing 220 includes a rear-housing bottom wall 221 and rear-housing side walls 222 connected to the rear-housing bottom wall 221. The rear-housing side walls 222 are disposed outside of the front-housing side walls 212 and are in contact with outsides of the front-housing side walls 212 and the flanges 213, so that the front housing 210 and the rear housing 220 are fastened together. An installation space 230 is reserved between the front-housing bottom wall 211 and the rear-housing bottom wall 221. By providing the housing 200 as a front housing 210 and a rear housing 220 that are fastened together, it is convenient to disassemble, assemble and replace component(s) disposed in the installation space 230.

Herein, the front housing 210 and the rear housing 220 may be fastened together only by using the flanges 213, or may be fastened together by using other components besides the flanges 213, such as a connector, which is not limited in the embodiments of the present disclosure.

It will be noted that the display apparatus 1000 in the embodiments of the present disclosure may include more or fewer components, and relative positions of these components may be changed.

Figure 3:
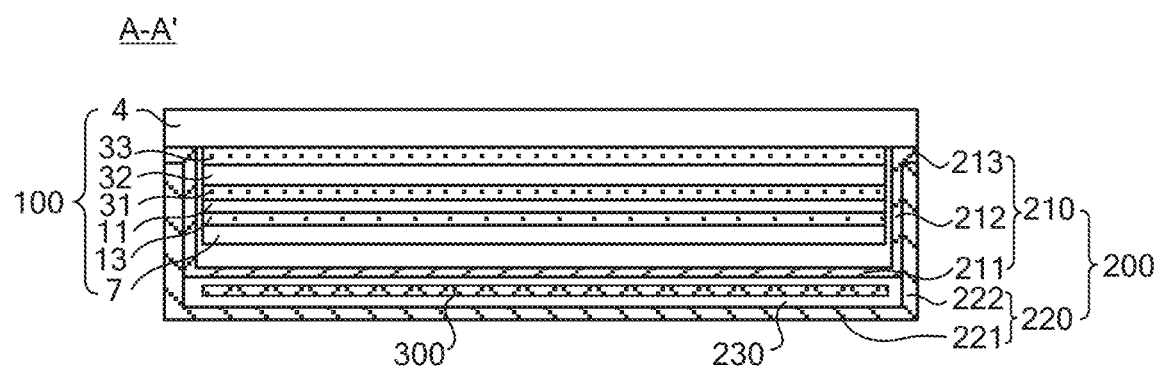
FIG. 3 is a sectional view of the display apparatus in FIG. 1 taken along the line A-A'.
Figure 4A:
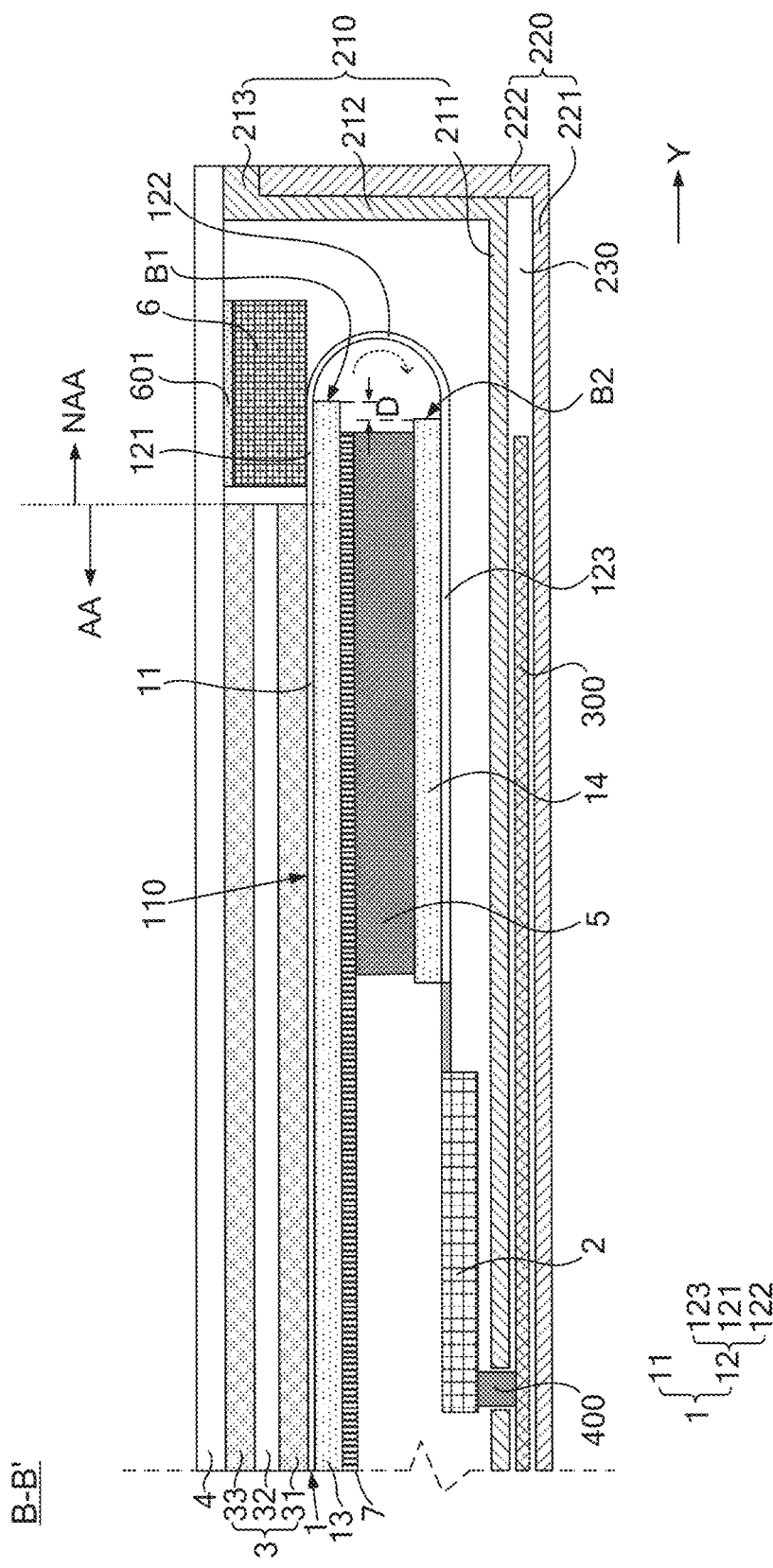
FIG. 4A is a sectional view of the display apparatus in FIG. 1 taken along the line B-B'.

Some embodiments of the present disclosure provide a display assembly, which may be applied into the display apparatus 1000 provided by the embodiments described above. As shown in FIGS. 3, 4A and 43, the display assembly 100 includes a flexible display panel 1, a cover plate 4, a first support layer 5 and a second support layer 6.

As shown in FIG. 3, the cover plate 4 is disposed at the opening 201 of the housing 200 of the display apparatus 1000, and the flexible display panel 1 is disposed in the housing 20.

In the embodiments of the present disclosure, the flexible display panel 1 may be an organic light-emitting diode (OLED) panel, or may be any other flexible display panel such as a quantum dot light emitting diode (QLED) panel or a micro light-emitting diode (Micro-LED) panel, which is not limited in the embodiments of the present disclosure.

Figure 4B:
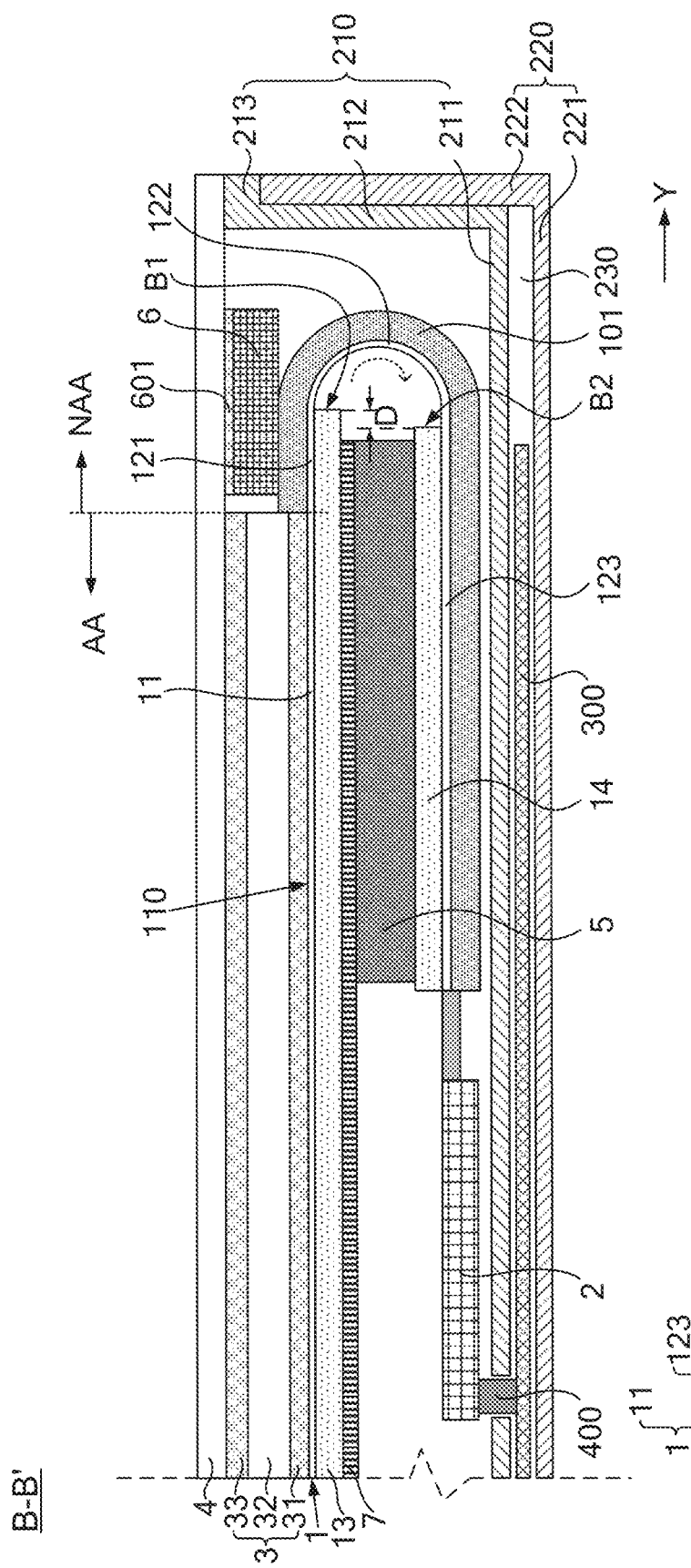
FIG. 4B is another sectional view of the display apparatus in FIG. 1 taken along the line B-B'.

As shown in FIGS. 4A and 4B, the flexible display panel 1 includes a main portion 11 with a display surface 110 and a bending portion 12 bent toward a surface of the main portion 11 facing away from the display surface 110. In an extending direction (represented by the dotted arrow in FIGS. 4A and 4B) of the bending portion 12, the bending portion 12 includes a first straight sub-portion 121, an arched sub-portion 122 and a second straight sub-portion 123 that are connected in sequence. The first straight sub-portion 121 is connected to the main portion 11, and the second straight sub-portion 123 is located at a surface of the main portion 11 facing away from the display surface 110.

It will be noted that, the main portion 11 and the bending portion 12 of the flexible display panel 1 may be of an integral structure. Or, the main portion 11 and the bending portion 12 may be separate components, and they are connected to each other to form the flexible display panel 1, the embodiments of the present disclosure do not limit thereto.

As shown in FIGS. 4A and 4B, the first straight sub-portion 121, the arched sub-portion 122 and the second straight sub-portion 123 included in the bending portion 12 are of an integral structure.

As shown in FIGS. 4A and 4B, the cover plate 4 is disposed above the display surface 110 of the main portion 11. The first support layer 5 is disposed at surfaces of the main portion 11 and the first straight sub-portion 121 facing away from the display surface 110, and is located between the main portion 11 and the second straight sub-portion 123 of the bending portion 12. The first support layer 5 is connected to the second straight sub-portion 123.

For example, the first support layer 5 is a foam tape. The foam tape is made by coating on one or both surfaces of a substrate made of foam with solvent-based (or hot-melt) pressure-sensitive adhesive. A material of the foam may be ethylene-vinyl acetate copolymer (EVA) or polyethylene (PE). It will be noted that the pressure-sensitive adhesive is bonded to the surfaces of the main portion 11 and the first straight sub-portion 121 facing away from the display surface 110.

For another example, the first support layer 5 is polyethylene terephthalate (PET) tape. The PET tape is made by coating both surfaces of a substrate made of PET with acrylic adhesive. It will be noted that the acrylic adhesive is bonded to the surfaces of the main portion 11 and the first straight sub-portion 121 facing away from the display surface 110.

The material of the first support layer 5 is not limited in the embodiments of the present disclosure, as long as it can support the flexible display panel 1 and maintain a bending state of the bending portion 12 of the flexible display panel 1.

As shown in FIGS. 4A and 4B, the second support layer 6 is disposed between the first straight sub-portion 121 of the bending portion 12 and the cover plate 4, and an orthogonal projection of the second support layer 6 on the cover plate 4 overlaps with an orthogonal projection of the first support layer 5 on the cover plate 4. The second support layer 6 is configured to support the first straight sub-portion 121 of the bending portion 12. It can be understood that the orthogonal projection of the second support layer 6 on the cover plate 4 overlapping with the orthogonal projection of the first support layer 5 on the cover plate 4 means that at least a portion of the orthogonal projection of the second support layer 6 (e.g., only a portion of the orthogonal projection as shown in FIGS. 4A and 4B, or all of the orthogonal projection) on the cover plate 4 is in a range of the orthogonal projection of the first support layer 5 on the cover plate 4.

Figure 5:
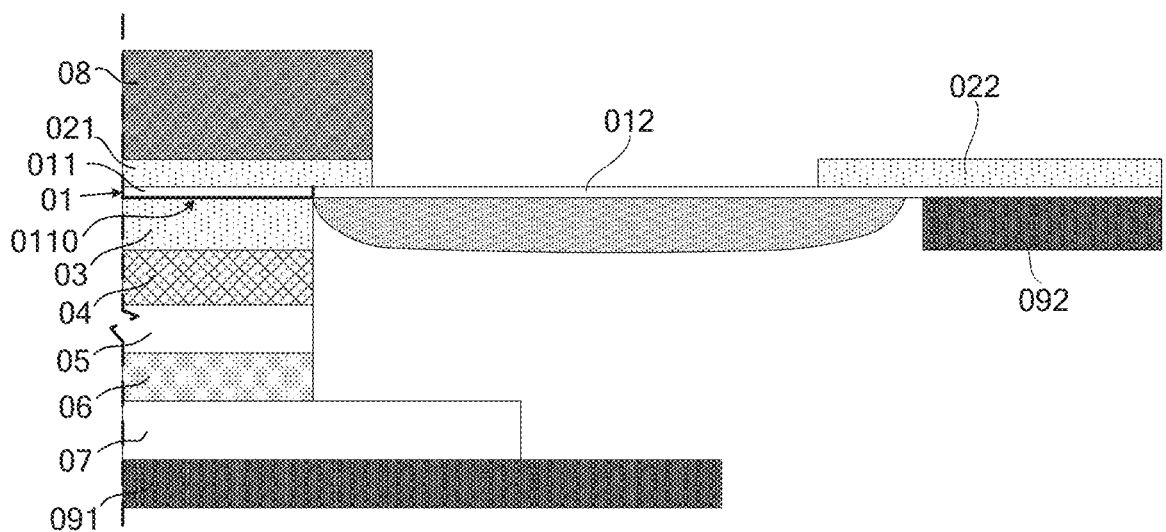
FIG. 5 is a schematic diagram showing a structure of a flexible display panel in a display assembly before bending.

As shown in FIG. 5, in an example, a display assembly includes a flexible display panel 01. The flexible display panel 01 includes a main portion 011 and a bendable portion 012 connected to a side of the main portion 011. A first backfilm 021 is disposed on a surface of the main portion 011 facing away from a display surface 0110 thereof, and a second backfilm 022 is disposed on a surface of an end away from the main portion 011 of the bendable portion 012. The second backfilm 022 and the first backfilm 021 are located on the same side of the flexible display panel 01. The display surface 0110 of the main portion 011 is sequentially provided with a first adhesive layer 03, a touch panel 04, a polarizer 05, a second adhesive layer 06 and a cover plate 07 that are sequentially stacked. A first support layer 08 is disposed on a side of the first backfilm 021 away from the main portion 011.

Herein, orthogonal projections of the first adhesive layer 03, the touch panel 04, the polarizer 05, and the second adhesive layer 06 on the cover plate 07 do not overlap with an orthogonal projection of the bendable portion 012 on the cover plate 07, and an orthogonal projection of the first support layer 08 on the cover plate 07 overlaps with the orthogonal projection of the bendable portion 012 on the cover plate 07.

Figure 6:
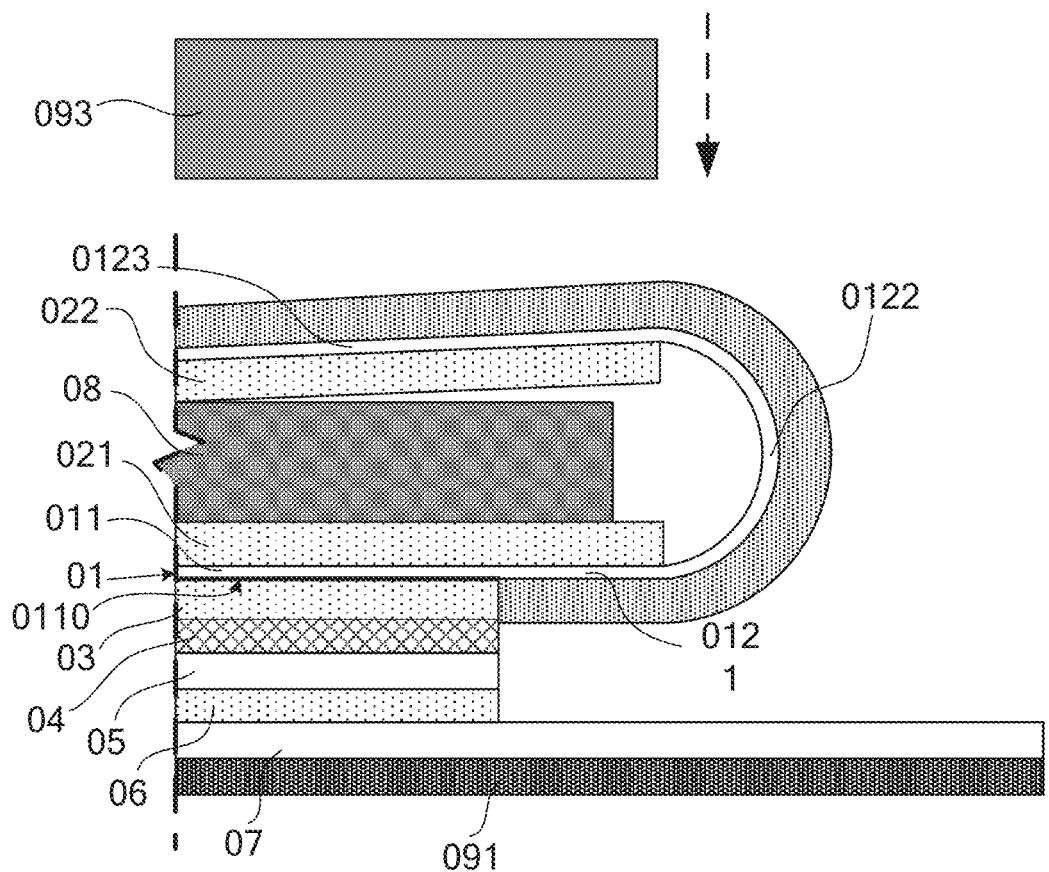
FIG. 6 is a schematic diagram showing a structure of the flexible display panel in the display assembly in FIG. 5 after bending.

In order to bend the bendable portion 012 of the flexible display panel 01 in FIG. 5 toward a surface of the main portion 011 facing away from the display surface 0110 to form the display assembly as shown in FIG. 6, the cover plate 07 is placed on a first stage 091, and the end of the bendable portion 012 away from the main portion 011 is placed on a second stage 092, then the end of the bendable portion 012 away from the main portion 011 is folded toward the surface of the main portion 011 facing away from the display surface 0110.

As shown in FIG. 6, after the end of the bendable portion 012 of the flexible display panel 01 away from the main portion 011 is folded toward the surface of the main portion facing away from the display surface 0110, a first straight sub-portion 0121, an arched sub-portion 0122 and a second straight sub-portion 0123 are formed, so that the second backfilm 022 is opposite to the first support layer 08. Then, the end of the bendable portion 012 away from the main portion 011 is pressed downward (in a direction represented by the dotted arrow in FIG. 6) by using a pressing head 093, so that the second backfilm 022 is bonded to the first support layer 08.

However, the first adhesive layer 03, the touch panel 04, the polarizer 05, and the second adhesive layer 06 are disposed in a stack between the main portion 011 of the flexible display panel 01 and the cover plate 07, there is a gap between the cover plates 07 and the bendable portion 012, the orthogonal projection of the first support layer 08 on the cover plate 04 overlaps with the orthogonal projection of the bendable portion 012 on the cover plate 04, and a material of the bendable portion 012 itself has a certain elasticity. Therefore, the arched sub-portion 0122 of the bendable portion 012 will bend downward to deform when the pressing head 093 presses down the second straight sub-portion 0123 of the bendable portion 012, and the arched sub-portion 0122 of the bendable portion 012 rebounds upwards due to action of its own elastic force when the pressing head 093 removes pressure, so that a phenomenon that the second backfilm 022 and the first support layer 08 cannot adhere to each other will occur (as shown in FIG. 6), thereby resulting in that the second backfilm 022 and the first support layer 08 are peeling off from each other, and reducing firmness of fixing between the flexible display panel 01 and the first support layer 08, which is not conducive to a normal operation of the flexible display panel 01.

In some embodiments of the present disclosure, as shown in FIGS. 4A and 4B, the second support layer 6 is disposed between the cover plate 4 and the first straight sub-portion 121 of the bending portion 12 of the flexible display panel 1, the orthogonal projection of the second support layer 6 on the cover plate 4 overlaps with the orthogonal projection of the first support layer 5 on the cover plate 4, and a thickness of the second support layer 6 is approximately equal to a size of the gap between the cover plate 4 and the first straight sub-portion 121. For example, as shown in FIGS. 4A and 4B, an optical sheet group 3 is disposed between the main portion 11 and the cover plate 4. The optical sheet group 3 includes an optical sheet 32, a first adhesive layer 31, and a second adhesive layer 33. The optical sheet 32 is connected to the main portion 11 of the flexible display panel 1 through the first adhesive layer 31, and is connected to the cover plate 4 through the second adhesive layer 33. Based on this, the thickness of the second support layer 6 is approximately equal to a thickness of the optical sheet group 3, i.e., a total thickness of the optical sheet 32, the first adhesive layer 31 and the second adhesive layer 33.

Based on this, the second support layer 6 may provide support for the first straight sub-portion 121 of the bending portion 12 when the pressing head presses down the second straight sub-portion 123 of the bending portion 12, so as to prevent the arched sub-portion 122 of the bending portion 12 from being subjected to large bending and deformation due to action of pressure of the pressing head, so that the arched sub-portion 122 of the bending portion 12 is prevented from rebounding upward due to the action of its own elastic force to cause peeling between the bending portion 12 and the first support layer 5 after the pressing head removes pressure, thereby improving the firmness of adhesion between the bending portion 12 and the first support layer 5, and ensuring the normal operation of the flexible display panel 1.

In the embodiments of the present disclosure, the optical sheet 32 is, for example, a polarizer, which may prevent ambient light from disturbing display of the flexible display panel 1 and reducing contrast.

In the embodiments of the present disclosure, the flexible display panel 1 have an active area and a non-active area located at least a side of the active area.

In some embodiments, as shown in FIGS. 4A and 4B, the main portion 11 is located in the active area AA, the first straight sub-portion 121 of the bending portion 12 and the arched sub-portion 122 are both located in the non-active area NAA.

In some other embodiments, the main portion 11 is located in the active area, and a portion of the bending portion 12 is located in the active area. For example, the first straight sub-portion 121 is located in the active area. In this case, a portion of the arched sub-portion 122 of the bending portion 12 connected to the first straight sub-portion 121 is also located in the active area. In this way, an display area of the display apparatus 1000 may be increased, and display effect of the display apparatus 1000 may be improved.

In some embodiments, the second support layer 6 is made of an elastic material. In this way, the second support layer 6 may provide a certain amount of compression during a process of pressing the second straight sub-portion 123 toward the first support layer 5 by the pressing head, so as to provide a cushioning protection effect for the bending portion 12.

For example, the elastic material is PET. The PET has good mechanical properties and good tensile strength and impact strength, so that the bending portion 12 may be well supported. For another example, the elastic material is rubber. The rubber has good elasticity and hardness, and may provide a certain amount of compression to play a role in cushioning and protecting the bending portion 12, and also play a good role in supporting the bending portion 12.

In some other embodiments, the second support layer 6 is made of a rigid material. In this way, the second support layer 6 may provide strong support for the bending portion 12 during the process of pressing the second straight sub-portion 123 toward the first support layer 5 by the pressing head, so that the bending portion 12 may bear a large pressure, thereby ensuring the firmness of the adhesion of the bending portion 12 and the first support layer 5.

In some examples, the rigid material is metal. For example, the rigid material is steel (e.g., stainless steel). Steel has advantages such as high strength, good plasticity, and good toughness, so that the bending portion 12 may be well supported.

The embodiments of the present disclosure do not limit the material of the second support layer 6, as long as the thickness of the second support layer 6 is sufficient to fill the gap between the cover plate 4 and the first straight sub-portion 121 of the bending portion 12, so that the second support layer 6 may function to support the first straight sub-portion 121.

In some embodiments, as shown in FIG. 4A, the second support layer 6 is connected to the cover plate 4, and is in direct contact with the first straight sub-portion 121, so that the second support layer 6 supports the first straight sub-portion 121.

For example, the second support layer 6 and the cover plate 4 are bonded together. For example, as shown in FIG. 4A, the second support layer 6 is connected to the cover plate 4 by coating a surface of the second support layer 6 away from the first straight sub-portion 121 with adhesive (e.g., pressure sensitive adhesive) 601.

In some other embodiments, as shown in FIG. 4B, the display assembly 100 further includes an adhesive layer 101 disposed at least on a surface of the arched sub-portion 122 facing away from the first support layer 5. For example, the adhesive layer 101 is only disposed on the surface of the arched sub-portion 122 facing away from the first support layer 5. For another example, as shown in FIG. 4B, the adhesive layer 101 is not only disposed on the surface of the arched sub-portion 122 facing away from the first support layer 5, but also is disposed on a surface of the first straight sub-portion 121 facing the second support layer 6, and a surface of the second straight sub-portion 123 away from the first straight sub-portion 121. That is, the adhesive layer 101 is disposed on an outer surface of the whole bending portion 12.

In this way, at least the arched sub-portion 122 of the bending portion 12 may be shaped and hardened after the outer surface of the whole bending portion 12 is coated with the adhesive layer 101 and the adhesive layer 101 is cured, so that the bending potion itself (especially the arched sub-portion 122) may be prevented from being largely deformed when the bending portion 12 is subjected to an external force, and a consistency of a shape of the bending portion 12 after bending may be ensured in mass production.

In a case where the adhesive layer 101 is not only disposed on the surface of the arched sub-portion 122 facing away from the first support layer 5, but also is disposed on the surface of the first straight sub-portion 121 facing the second support layer 6, an end of the adhesive layer 101 may be adhered to a side of the optical sheet group 3 in the extending direction of the bending portion 12. For example, as shown in FIG. 4B, an end of the adhesive layer 101 may be connected to the optical sheet 32, so that the bending portion 12 and the optical sheet group 3 may be firmly adhered to each other, and a risk of peeling at a position of the connection of the flexible display panel 1 and the optical sheet group 3 during a bending process may be reduced.

In addition, during the bending process of the bending portion 12, or when the pressing head applies pressure to the bending portion 12, the adhesive layer 101 may also balance stress effect of the bending portion 12 itself, so as to prevent the flexible display panel 1, especially the bending portion 12, from breaking.

In some examples, in the case where the adhesive layer 101 is not only disposed on the surface of the arched sub-portion 122 facing away from the first support layer 5, but also is disposed on the surface of the first straight sub-portion 121 facing the second support layer 6, the second support layer 6 is connected to the cover plate 4 and is in direct contact with the adhesive layer 101, so that the second support layer 6 supports the first straight sub-portion 121.

Herein, the connection manner of the second support layer 6 and the cover plate 4 may refer to the connection manner in the above embodiments, which will not be repeated here.

It will be noted that, in a case where the adhesive layer 101 is further disposed on the surface of the first straight sub-portion 121 facing the second support layer 6, and the end of the adhesive layer 101 is adhered to the side of the optical sheet group 3, the gap between the cover the plate 4 and the first straight sub-portion 121 is a gap between the cover plate 4 and the adhesive layer 101. In this case, the thickness of the second support layer 6 may be less than the thickness of the optical sheet group 3.

Herein, a material of the adhesive layer 101 includes thermosetting resin or ultraviolet (UV) curable resin. For example, the material of the adhesive layer 101 is pressure-sensitive adhesive (PSA), such as an acrylate pressure-sensitive adhesive.

Figure 7A:
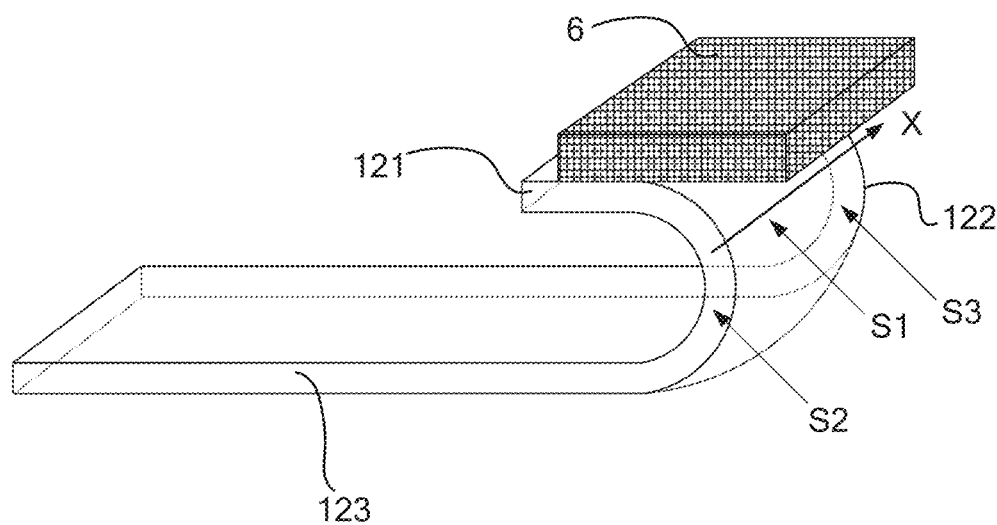
FIG. 7A is a perspective view of a flexible display panel and a second support layer in the display apparatus in FIG. 4A.
Figure 7B:
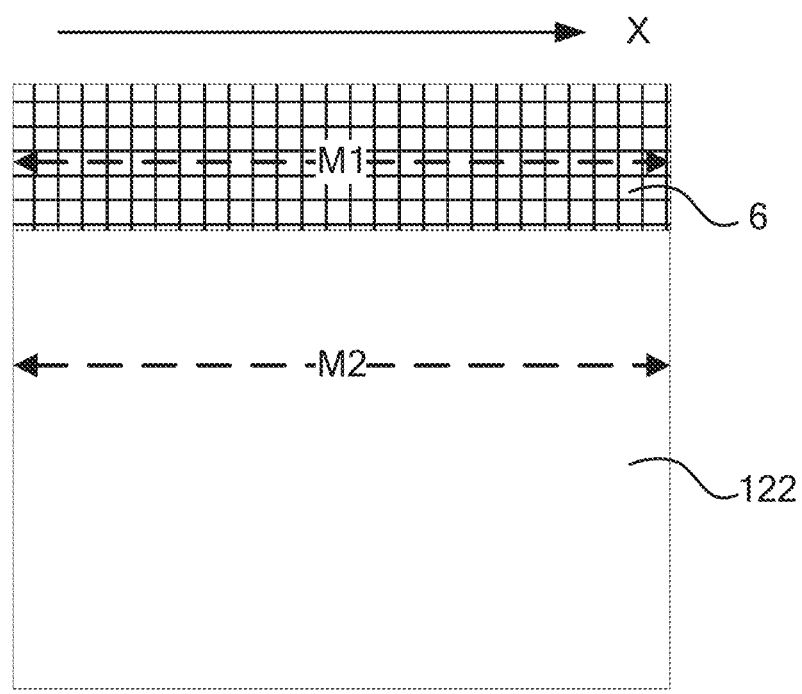
FIG. 7B is a right view of the flexible display panel and the second support layer in the display apparatus in FIG. 4A.

In some embodiments, as shown in FIGS. 7A and 7B, the arched sub-portion 122 has surfaces S1 perpendicular to the thickness thereof, and a first side surface S2 and a second side surface S3 that are directly connected to the surface S1 and opposite to each other. A dimension M1 of the second support layer 6 is approximately equal to a dimension M2 of the bending portion 12 in a direction X from the first side surface S2 to the second side surface S3. For convenience of description, the direction X will be referred to as a first direction X hereinafter. In this way, the second support layer 6 may integrally support the first straight sub-portion 121 of the bending portion 12 in the first direction X, so that the first straight sub-portion 121 of the bending portion 12 is maintained to be stable by the supporting force of the second support layer 6 in the first direction X, and the first straight sub-portion 121 of the bending portion 12 is prevented from tilting in the first direction X during the process that the pressing head presses the second straight sub-portion 123 to the first support layer 5, which is beneficial to improving an supporting effect of the second support layer 6 on the first straight sub-portion 121 of the bending portion 12.

In some embodiments, as shown in FIGS. 4A and 4B, the display assembly further includes a first backfilm 13 and a second backfilm 14. The first backfilm 13 is disposed on surfaces of the main portion 11 and the first straight sub-portion 121 facing the first support layer 5, and the second backfilm 14 is disposed on a surface of the second straight sub-portion 123 of the bending portion 12 facing the first support layer 5 a surface of the second straight sub-portion 123 facing away from the front-housing bottom wall 211).

The first backfilm 13 and the second backfilm 14 may support the flexible display panel 1, so as to facilitate subsequent assembly with other film layers. The first backfilm 13 and the second backfilm 14 may each be, for example, a PET tape or a polyimide (PI) tape. Herein, the PI tape is made by coating one or both surfaces of a substrate made of PI with pressure-sensitive adhesive (e.g., silicone pressure-sensitive adhesive).

As shown in FIGS. 4A and 4B, the first backfilm 13 is closer to the arched sub-portion 122 of the bending portion 12 than the second backfilm 14 in a direction Y from the first support layer 5 to the arched sub-portion 122 (parallel to the surface of the first support layer 5). For convenience of description, the direction Y will be referred to as a second direction Y hereinafter. That is, an edge B1 of the first backfilm 13 proximate to the arched sub-portion 122 is closer to the arched sub-portion 122 than an edge B2 of the second backfilm 14 proximate to the arched sub-portion 122. In this way, a transition from the arched sub-portion 122 to the second straight sub-portion 123 may be smooth on a basis of achieving a small bending radius of the bending portion 12, and an excessive stress at the connection of the bending portion 12 and the second backfilm 14 caused by an excessively small angle between the arched sub-portion 122 and the second straight sub-portion 123 is avoided.

In the embodiments of the present disclosure, a plurality of metal wires (e.g., data lines extending from the active area of the flexible display panel 1 to the non-active area for transmitting data signals to pixels in the active area) are arranged inside the bending portion 12 of the flexible display panel 1. If stress at the position of the connection of the bending portion 12 and the second backfilm 14 is too large, a risk of breakage of the plurality of metal wires disposed within the bending portion 12 will be increased.

Based on this, in the embodiments of the present disclosure, the first backfilm 13 is closer to the arched sub-portion 122 of the bending portion 12 in the second direction Y than the second backfilm 14, so that the risk of the breakage of the metal wires in the bending portion 12 may be reduced. Moreover, an apex of arch of the arched sub-portion 122 of the bending portion 12 may be moved away from the front-housing side wall 212, thereby greatly reducing a risk of collision between the arched sub-portion 122 and the front-housing side wall 212 during an assembly process of the display assembly 100 and the front housing 210.

In some examples, a distance D between an orthogonal projection of the edge B1 of the first backfilm 13 proximate to the arched sub-portion 122 of the bending portion 12 on the cover plate 4 and an orthogonal projection of the edge B2 of the second backfilm 14 proximate to the arched sub-portion 122 of the bending portion 12 on the cover plate 4 is in a range of 30 μm to 90 μm.

The distance D should not be too large or too small. If the distance D is too large, an angle between the arched sub-portion 122 of the bending portion 12 and the first straight sub-portion 121 will be reduced, thereby increasing the stress at the position of the connection of the bending portion 12 and the first backfilm 13, and increasing the risk of breakage of the flexible display panel 1; if the distance D is too small, it is not conducive to reducing the stress at the position of the connection of the bending portion 12 and the second backfilm 14. In the embodiments of the present disclosure, the distance D is set in the range of 30 μm to 90 μm, so that the stress at the position of the connection of the bending portion 12 and the second backfilm 14 may be significantly reduced, and the excessive stress at the position of the connection of the bending portion 12 and the first backfilm 13 may be avoided.

In some examples, the orthogonal projection of the edge B2 of the second backfilm 14 proximate to the arched sub-portion 122 on the cover plate 4 is within a range of an orthogonal projection of the second support layer 6 on the cover plate 4.

In order to ensure that the second straight sub-portion 123 is stressed uniformly when the pressing head applies pressure to the second straight sub-portion 123 to improve the fixing effect of the second straight sub-portion 123 and the first support layer 5, a size of the pressing head adopted in the embodiments of the present disclosure is equal to or greater than a size of the second straight sub-portion 123. Based on this, when the pressing head applies pressure to the second straight sub-portion 123, a portion of the first straight sub-portion 121 corresponding to the second straight sub-portion 123 in a direction in which the pressure is applied by the pressing head will also be subjected to a force of the pressure. Therefore, in the embodiments of the present disclosure, by providing the orthogonal projection of the edge B2 of the second backfilm 14 proximate to the arched sub-portion 122 on the cover plate 4 being within the range of the orthogonal projection of the second support layer 6 on the cover plate 4, the supporting effect of the second support layer 6 on the first straight sub-portion 121 may be improved.

In the embodiments of the present disclosure, as shown in FIGS. 4A and 4B, the first support layer 5 is located between the first backfilm 13 and the second backfilm 14.

It will be noted that, as shown in FIGS. 4A and 43, in a case where the first backfilm 13 is in direct contact with the surfaces of the main portion 11 and the first straight sub-portion 121, and the first backfilm 13 is the PI tape, the pressure-sensitive adhesive in the PI tape is in direct contact with the surfaces of the main portion 11 and the first straight sub-portion 121, so that the first backfilm 13 is adhered to the main portion 11 and the first straight sub-portion 121. Similarly, in a case where the second backfilm 14 is in direct contact with the surface of the second straight sub-portion 123 and the surface of the first support layer 5, and the second backfilm 14 is the PI tape, the PI tape may be made by coating both surfaces of the substrate with pressure-sensitive adhesive, the pressure-sensitive adhesive on both surfaces of the substrate is in direct contact with the surface of the second straight sub-portion 123 and the surface of the first support layer 5, so that the surface of the second backfilm 14 is adhered to the surfaces of the second straight sub-portion 123 and the first support layer 5.

In some embodiments, as shown in FIGS. 4A and 4B, the display assembly further includes a third support layer 7 disposed between the main portion 11 and the first support layer 5. That is, the third support layer 7 is disposed on a surface of the main portion 11 facing away from the display surface thereof, for example, the third support layer 7 is disposed on a surface of the first backfilm 13 away from the main portion.

In some examples, the third support layer 7 may further be located between the first straight sub-portion 121 and the first support layer 5.

In some embodiments, the third support layer 7 is configured to support the main portion 11. Therefore, the third support strip 7 is made of a material with certain rigidity, such as metal, glass, ceramic, or an organic material.

Herein, the third support layer 7 may keep the main portion 11 in a certain shape and avoid large deformation of the main portion 11 due to the certain rigidity of the third support layer 7. Or, the third supporting layer 7 further has certain toughness. In this way, the third support layer 7 may provide certain support for the main portion 11. Moreover, the main portion 11 may be folded, or rolled according to actual needs, so that the active area of the flexible display panel 1 may also achieve a folding function.

For example, the third support strip 7 is made of a rigid thermal conductive material such as stainless steel or copper (Cu). In this way, the third support layer further has a good thermal conductivity, so that the third support layer 7 may play a role of dissipating heat generated by the main portion 11.

It will be noted that, in a case where the main portion 11 of the flexible display panel 1 is also foldable, a material of the cover plate 1 is a flexible material, such as ultra-thin glass.

In some embodiments, the display assembly 100 further includes a touch function layer disposed between the main portion 11 and the cover plate 4, so that the display apparatus 1000 including the display assembly 100 may implement a touch function.

Figure 8:
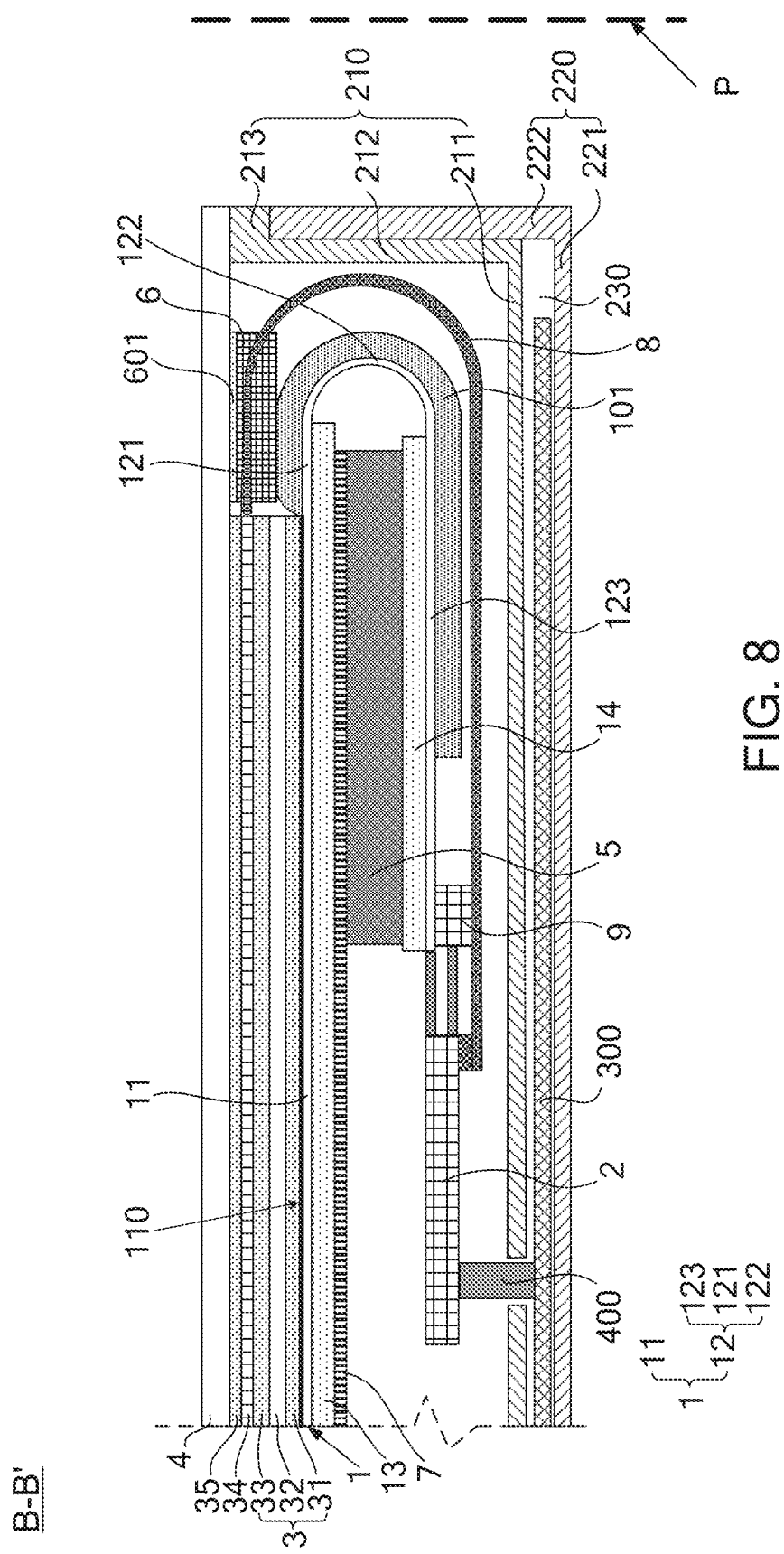
FIG. 8 is yet another sectional view of the display apparatus in FIG. 1 taken along the line B-B'.

For example, as shown in FIG. 8, the touch function layer 34 is disposed between the optical sheet group 3 and the cover plate 4. The touch function layer 34 is connected to the optical sheet 32 through a second adhesive layer 33, and is connected to the cover plate 4 through a third adhesive layer 35. In this way, the touch function layer 34 may sense touch of the user's finger well, thereby being beneficial to improving a sensitivity of the touch function layer 34.

As shown in FIGS. 4A, 4B, and 8, the display assembly 100 further includes a circuit board 2. The circuit board 2 is connected to the second straight sub-portion 123, and is located at a surface of the main portion 11 facing away from the display surface 110. The circuit board 2 is further connected to a main board 300 located in the installation space 230 to achieve control of the display of the flexible display panel 1.

Herein, a connection between the circuit board 2 and the second straight sub-portion 123 may be a bonding connection between the circuit board 2 and the second straight sub-portion 123 through metal wires disposed in the second straight sub-portion 123.

As shown in FIGS. 4A, 4B and 8, the circuit board 2 and the main board 300 may be connected through a connector 400 (e.g., board-to-board connector).

The circuit board 2 may be flexible, but the embodiments of the present disclosure is not limited thereto, and the circuit board 2 may also be inflexible.

As shown in FIG. 8, the display assembly 100 further includes a flexible circuit board 8, an end of the flexible circuit board 8 is connected to the touch function layer 34, and the other end thereof is connected to the circuit board 2. The circuit board 2 is connected to the main board 300, and the flexible circuit board 8 is connected to the touch function layer 34 and the circuit board 2, so that transmission between signals from the touch function layer 34 and the main board 300 may be achieved.

Herein, the connection between the flexible circuit board 8 and the touch function layer 34 is, for example, a bonding connection through pins, and the connection of the flexible circuit board 8 and the circuit board 2 is, for example, a bonding connection through pins.

Figure 9:
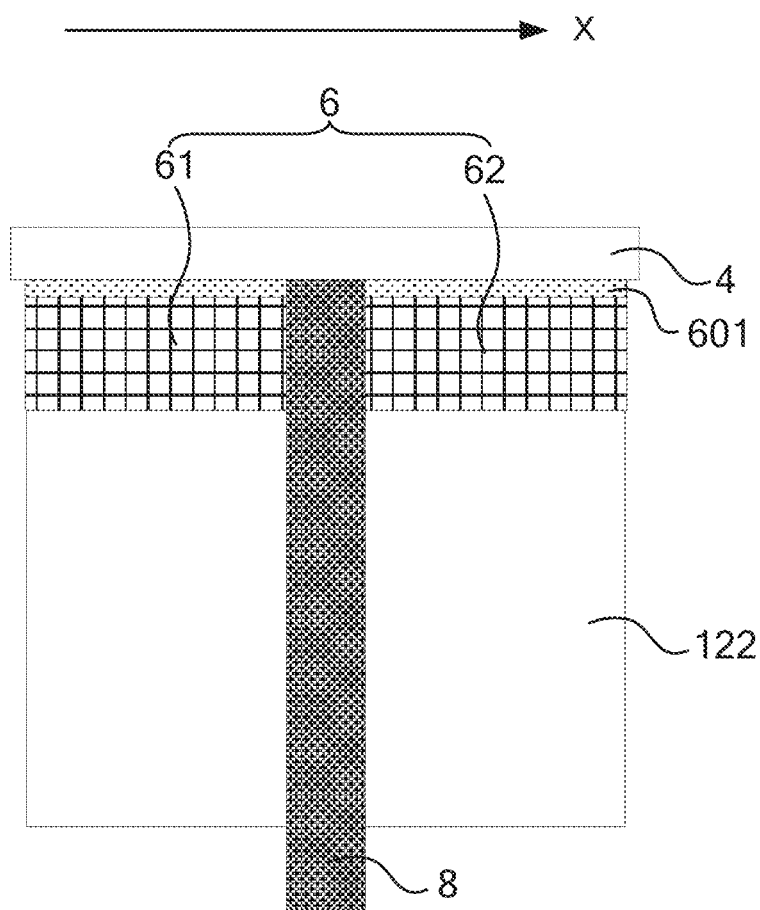
FIG. 9 is a right view of a display assembly in the display apparatus in FIG. 8.

Based on this, as shown in FIGS. 8 and 9, an orthogonal projection of the second support layer 6 on a reference plane P is non-overlapping with an orthogonal projection of the flexible circuit board 8 on the reference plane P. Herein, the reference plane P is a plane perpendicular to a plane where the main portion 11 is located. That is, in the first direction X, the second support layer 6 and the flexible circuit board 8 are staggered arranged. Thus, an interference between a position of the flexible circuit board 8 and a position of the second support layer 6 may be avoided, and it is ensured that the flexible circuit board 8 may be connected to the circuit board 2 successfully.

In some examples, as shown in FIG. 9, the second support layer 6 includes two second support sub-layers 61 and 62 arranged at intervals in the first direction X. The flexible circuit board 8 is arranged between the second support sub-layers 61 and 62. Thus, in the embodiments of the present disclosure, the second support layer 6 is designed into two separate portions to achieve the staggered arrangement of the second support layer 6 and the flexible circuit board 8. That is, the orthogonal projection of the second support layer 6 on the reference plane P being non-overlapping with the orthogonal projection of the flexible circuit board 8 on the reference plane P is achieved.

In some embodiments, as shown in FIG. 8, in a case where the display assembly 100 includes the touch function layer 34, the display assembly 100 further includes a driver chip 9. The driver chip 9 is disposed on a side of the second straight sub-portion 123 of the flexible display panel 1 away from the first straight sub-portion 121, and is electrically connected to the circuit board 2 through circuit structures in the flexible display panel 1, so that there is no need to reserve a bonding space between the driver chip 9 and the circuit board 2 at a position of the flexible display panel 1 where a bezel of the display apparatus 1000 located.

Figure 10:
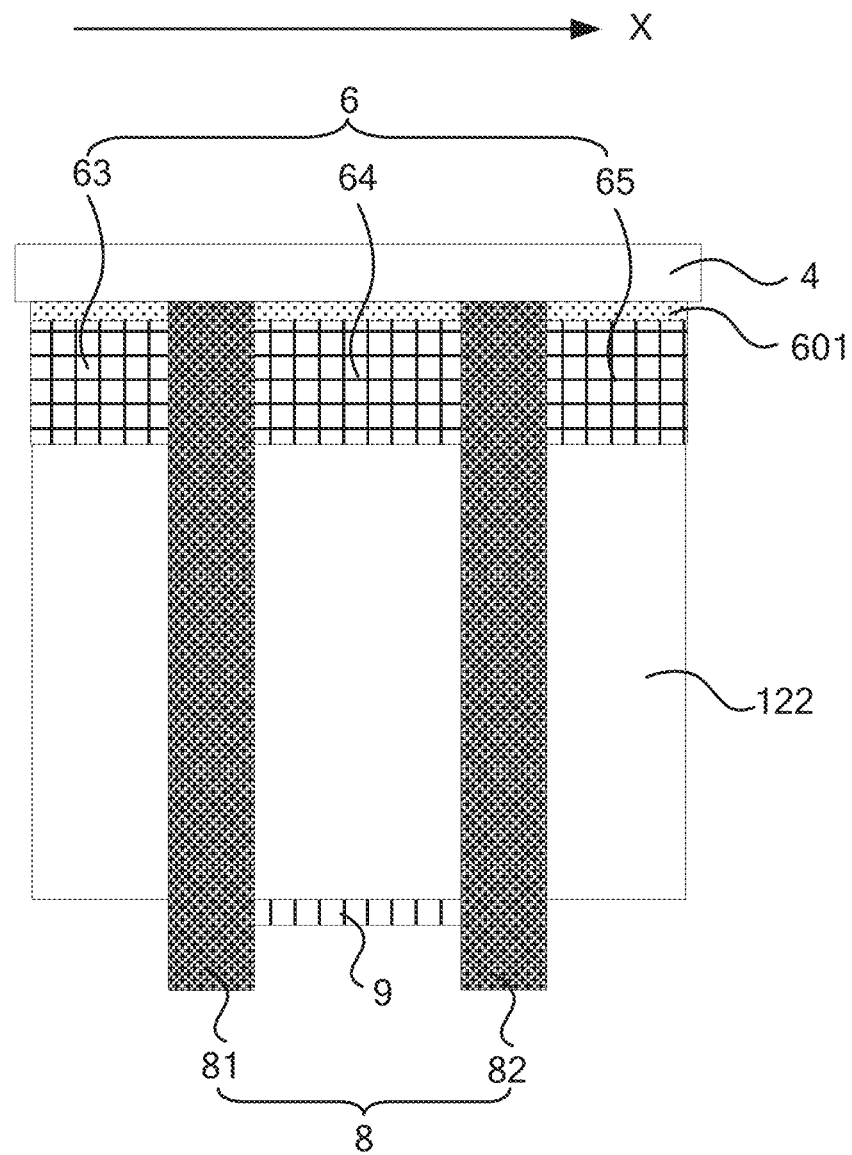
FIG. 10 is another right view of the display assembly in the display apparatus in FIG. 8.

Based on this, in order to prevent a position of the flexible circuit board 8 from interfering with a position at a side of the bending portion 12 where the driver chip 9 located, as shown in FIG. 10, the flexible circuit board 8 includes two flexible sub-circuit boards 81 and 82 arranged at intervals in the first direction X, and are respectively located at two sides of the driver chip 9. In this way, not only the interference between positions of the flexible circuit board 8 and the driver chip 9 is avoided, but also arrangement between the flexible circuit board 8 and the bending portion 12 is more compact, and a space (i.e., space where the lower bezel of the display apparatus 1000 located) between the display assembly 100 and the front-housing side wall 212 is full utilized, so that it is beneficial to reduce a size of the lower bezel of the display apparatus.

Based on this, as shown in FIG. 10, the second support layer 6 includes a first sub-support layer 63, a second sub-support layer 64, and a third sub-support layer 65 arranged at intervals. In the first direction X, the first sub-support layer 63, the second sub-support layer 64 is respectively located at both sides of the flexible sub-circuit board 81, and the second sub-support layer 64 and the third sub-support layer 65 are respectively located at both sides of the flexible sub-circuit board 82. Thus, the first support layer 5 is designed into three separate portions, so that no positional interference occurs between the first support layer 5 and the two flexible sub-circuit boards 81.

Figure 11:
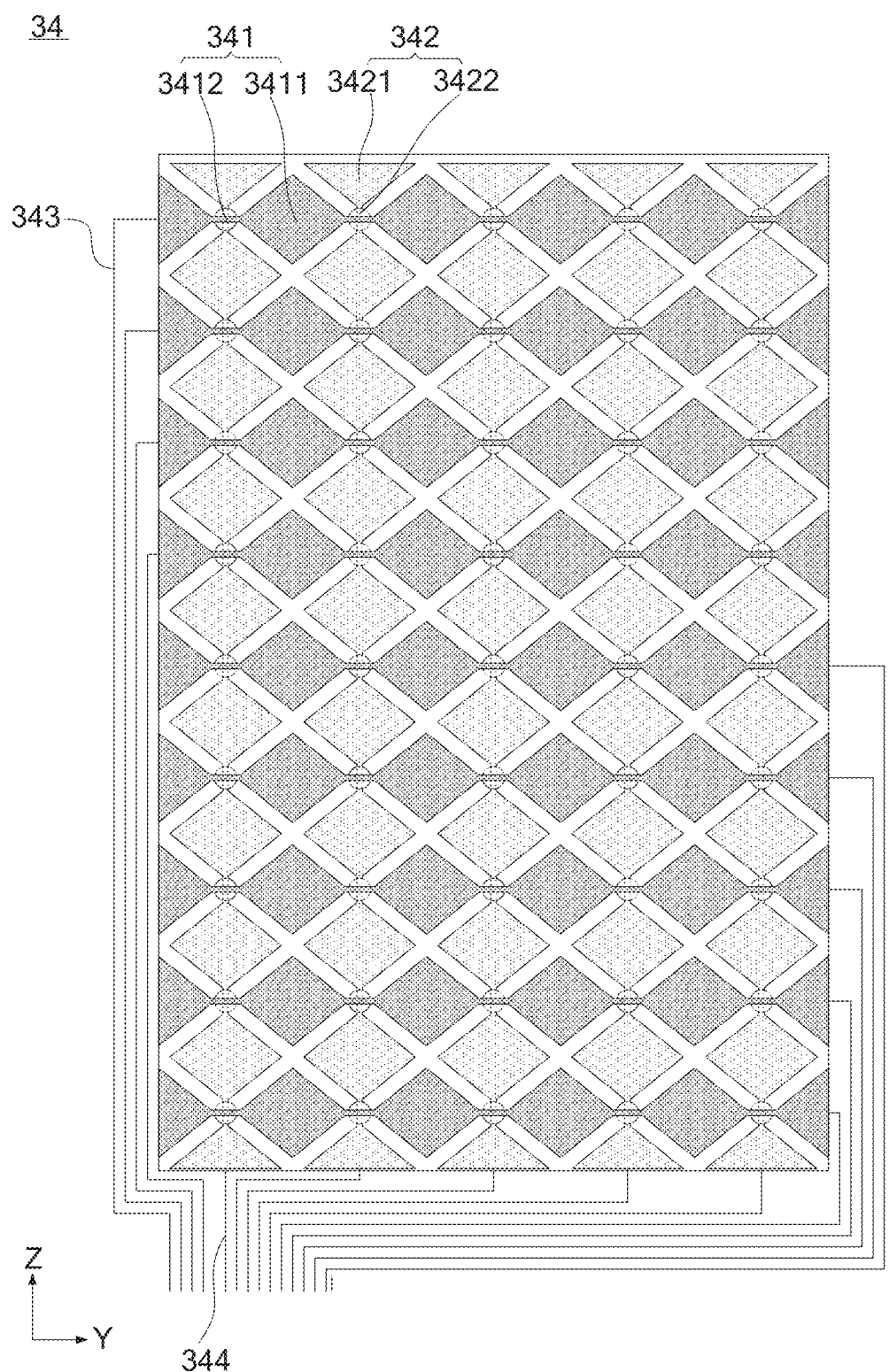
FIG. 11 is a schematic diagram showing a structure of a touch function layer in the display assembly, in accordance with some embodiments.

In some embodiments, touch manner of the touch function layer 34 may be a mutual-capacitive type or a self-capacitive type. For example, as shown in FIG. 11, the touch function layer 34 includes a plurality of first touch electrodes 341 and a plurality of second touch electrodes 342 arranged crosswise. The plurality of first touch electrodes 341 are arranged in the second direction Y, and the plurality of second touch electrodes 342 are arranged in the third direction Z. Each first touch electrode 341 includes a plurality of first sub-electrodes 3411 and a plurality of first connection electrodes 3412, each first connection electrode 3412 is connected to respective two adjacent first sub-electrodes 3411. Each second touch electrode 342 includes a plurality of second sub-electrodes 3421 and a plurality of second connection electrodes 3422, each second connection electrode 3422 is connected to respective two adjacent second sub-electrodes 3421.

It will be noted that, the first sub-electrode 3411 and the second sub-electrode 3421 are disposed in the same layer, and the first connection electrode 3412 and the second connection electrode 3422 are isolated from each other at crossing position thereof through an insulating pattern.

Herein, the first touch electrode 341 is, for example, a touch sensing electrode (Rx), the second touch electrode 342 is, for example, a touch scanning electrode (Tx), and the two touch electrodes are arranged crosswise, so that there is an opposite portion between each first sub-electrode 3411 and a corresponding second sub-electrode 3421. Therefore, the first sub-electrode 3411 and the second sub-electrode 3421 disposed in the same layer and proximate to each other form a mutual capacitance, so as to achieve multi-touch.

As shown in FIG. 11, the touch function layer 34 further includes first signal lines 343 each connected to a respective first touch electrode 341 and second signal lines 344 each connected to a respective second touch electrode 342. Based on this, the touch function layer 34 may be bonded to the flexible circuit board 8 through the first signal lines 343 and the second signal lines 344. For example, the first signal lines 343 and the second signal lines 344 may be located in the non-active area of the display apparatus 1000.

It will be noted that, the term "same layer" refers to a film for forming specific patterns is formed by using the same film-forming process, and then a patterning process is performed on the film by using the same mask to form a layer structure. The patterning process may include exposure, development and etching processes, and the specific patterns in the formed layer structure may be continuous or discontinuous, and these specific patterns may also be at different heights or have different thicknesses.

In some embodiments, the touch function layer 34 may also be integrated in the flexible display panel 1 to achieve the touch function of the display apparatus 1000.

It will be noted that, the touch function layer 34 in the embodiments of the present disclosure is a transparent film layer. In this way, an influence of the touch function layer 34 on the normal display of the flexible display panel 1 may be avoided, for example, each electrode in the touch function layer 34 is a transparent electrode (e.g., indium tin oxide (ITO) electrode).

It can be understood that the structure of the touch function layer 34 is merely an example, and the touch function layer 34 may be provided in various ways, which is not limited in the embodiment of the present disclosure.

It will be noted that, materials of the first adhesive layer 31, the second adhesive layer 33 and the third adhesive layer 35 in the embodiments of the present disclosure may each be optically clear adhesive (OCA), but the embodiments of the present disclosure do not limited to thereto. Since the first adhesive layer 31, the second adhesive layer 33, and the third adhesive layer 35 are all located on a side of the display surface of the flexible display panel 1, the materials of the first adhesive layer 31, the second adhesive layer 33 and the third adhesive layer 35 may also be other materials capable of achieving adhesion and transparency, so as to avoid affecting the normal display of the flexible display panel 1.

Some embodiments of the present disclosure provide a method of manufacturing a display assembly 100. As shown in FIGS. 12A to 12I and 14, the method includes the following steps.

Figure 12A:
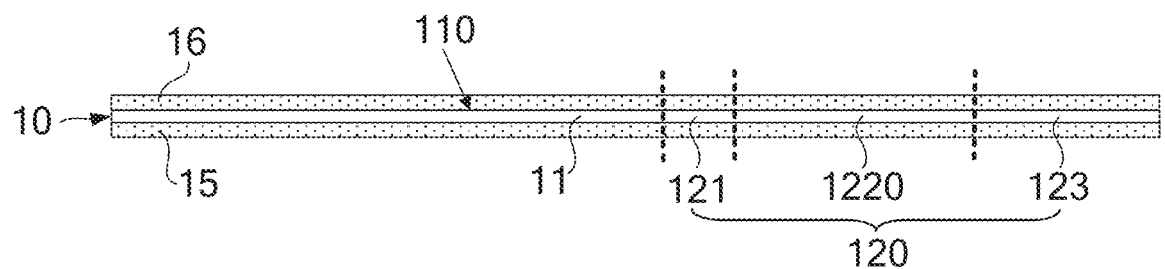
FIGS. 12A to 12I are schematic diagrams showing a manufacturing process of a display assembly, in accordance with some embodiments.

In step 1 (S1), as shown in FIG. 12A, a flexible display panel to be processed 10 is provided. The flexible display panel to be processed 10 includes a main portion 11 and a bendable portion 120. The bendable portion 120 includes a first straight sub-portion 121, a middle sub-portion 1220, and a second straight sub-portion 123 that are sequentially connected. The first straight sub-portion 121 is further connected to the main portion 11.

In some examples, a lower backfilm 15 is covered on a surface of the flexible display panel to be processed 10 facing away from the display surface 110, and an upper backfilm 16 is covered on the display surface 110 of the flexible display panel to be processed 10. The lower backfilm 15 and the upper backfilm 16 may protect the flexible display panel to be processed 10 to avoid damages such as surface scratch. Moreover, during a assembly process, the lower backfilm 15 may also support the flexible display panel to be processed 10, so as to facilitate subsequent assembly with other film layers.

For example, the lower backfilm 15 and the upper backfilm 16 may each be a PET tape or a PI tape, which may be directly attached to surfaces of the flexible display panel to be processed 10.

The main portion 11 of the flexible display panel to be processed 10 and the first straight sub-portion 121, the middle sub-portion 1220 and the second straight sub-portion 123 of the bendable portion 120 in FIG. 12A are respectively illustrated by being separated by dotted lines, which are only used for distinguishing different portions of the flexible display panel to be processed 10 and do not indicate whether the portions are of an integral structure.

Figure 12B:
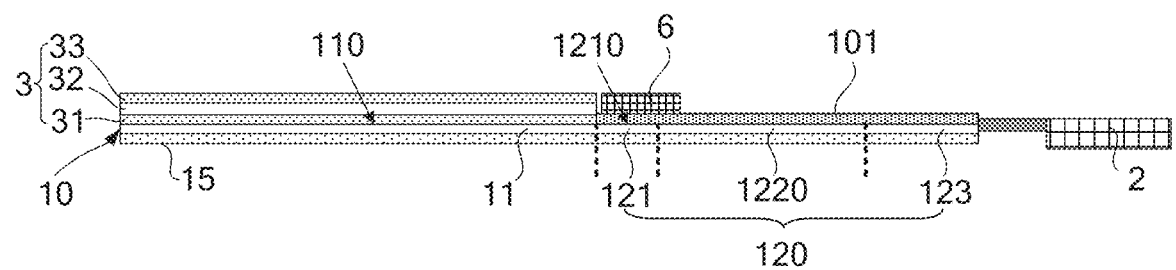

In step 2 (S2), as shown in FIG. 12B, a second support layer 6 is disposed on a surface 1210 of the first straight sub-portion 121 directly connected to the display surface 110.

For example, the second support layer 6 is directly disposed on the surface 1210 of the first straight sub-portion 121.

For another example, before S2, the method further includes: providing an adhesive layer 101 on an entire surface of the bendable portion 120 directly connected to the display surface 110 (including the surface 1210 of the first straight sub-portion 121, a surface of the middle sub-portion 1220 directly connected to the surface 1210, and a surface of the second straight sub-portion 123 directly connected to the surface of the middle sub-portion 1220 above-mentioned). Based on this, the second support layer 6 is disposed on a surface of the adhesive layer 101 away from the bendable portion 120.

Herein, a method of providing the adhesive layer 101 on the surface of the bendable portion 120 directly connected to the display surface 110 may be as follows: coating the surface (of the bendable portion 120 directly connected to the display surface 110 with adhesive, e.g., PSA, and semi-curing the adhesive.

Herein, "semi-cured adhesive" refers that the material forming the adhesive layer 101 is partially cured. That is, the adhesive layer 101 is in a semi-cured state. Since the adhesive layer 101 in the semi-cured state has no adhesion, a portion of the bendable portion 120 covered by the adhesive layer 101 is not shaped, which is beneficial to the subsequent bending of the bendable portion 120.

In step 3 (S3), as shown in FIG. 12B, an optical sheet group 3 is disposed on the display surface 110 of the main portion 11.

For example, a first adhesive layer 31, an optical sheet 32, and a second adhesive layer 33 are sequentially formed on the display surface 110 of the main portion 11.

It will be noted that, in a case where the display surface 110 of the flexible display panel to be processed 10 is covered with the upper backfilm 16, the upper backfilm 16 needs to be removed before S2 and S3 are performed. In the embodiments of the present disclosure, the upper backfilm 16 may be removed by laser irradiation. Or, the upper backfilm 16 may be removed by chemical dissolution method, for example, the upper backfilm 16 may be removed by a solution.

Figure 12C:
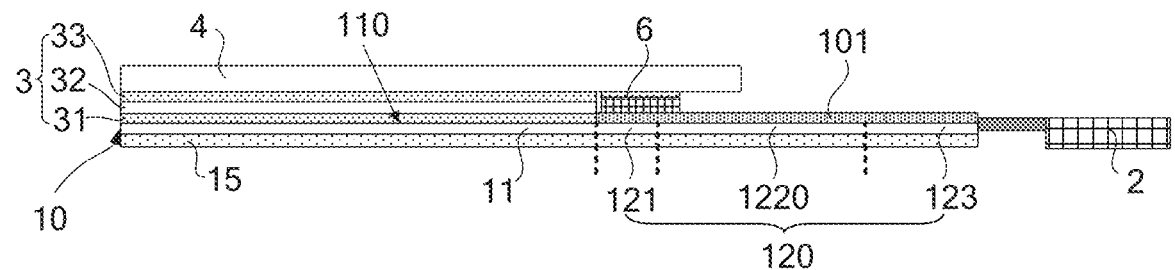

In step 4 (S4), as shown in FIG. 12C, a cover plate 4 is disposed above the display surface 110 of the main portion 11 and on the surface of the second support layer 6 facing away from the first straight sub-portion 121.

Herein, the cover plate 4 is, for example, glass or ultrathin glass.

For example, in a case where the first adhesive layer 31, the optical sheet 32, and the second adhesive layer 33 are sequentially formed on the display surface 110 of the main portion 11, the surface of the second support layer 6 facing away from the first straight sub-portion 121 may be coated with adhesive, e.g., pressure-sensitive adhesive, and then the cover plate 4 is placed on a surface of the second adhesive layer 33 away from the optical sheet 32 and the surface of the second support layer 6 facing away from the first straight sub-portion 121, so that the cover plate 4 is connected to the main portion 11 through the second adhesive layer 33 and the cover plate 4 and the surface of the second support layer 6 facing away from the first straight sub-portion 121 are connected together through the adhesive.

Figure 14:
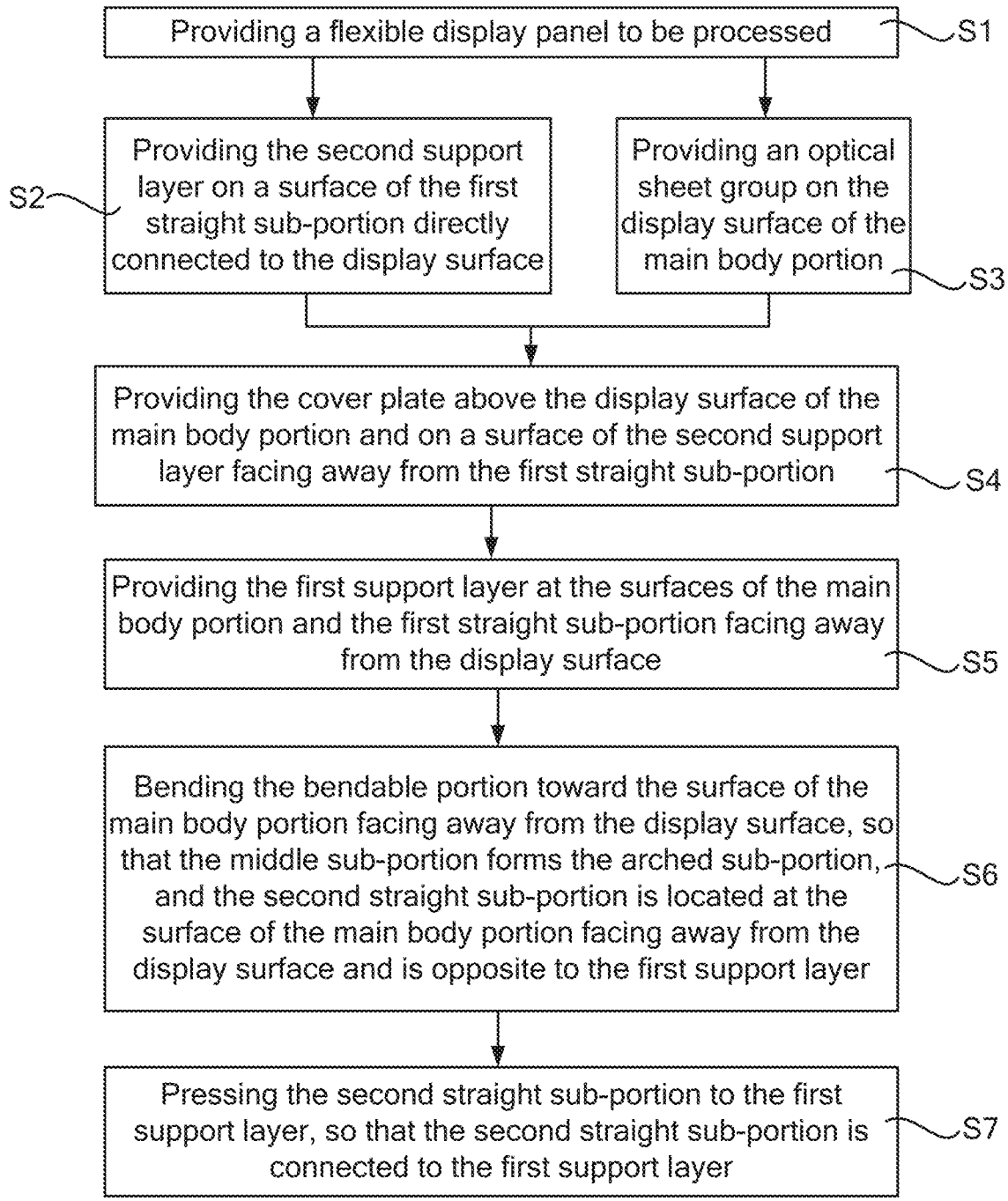
FIG. 14 is a flow diagram of a method of manufacturing a display assembly, in accordance with some embodiments.

It will be noted that, in the embodiments of the present disclosure, S2 may be performed first and then S3 may be performed, or S3 may be performed first and then S2 may be performed, or S2 and S3 may be performed at the same time, as long as the second support layer 6 may fill the gap between the bendable portion 120 and the cover plate 4 in a thickness direction of the bendable portion 120 after S4 is completed. FIG. 14 are illustrated by taking an example in which S2 and S3 are performed at the same time.

In the embodiments of the present disclosure, while the optical sheet group 3 is disposed on the display surface 110 of the main portion 11, the adhesive layer 101 may also be formed on the surface of the bendable portion 120. Thus, the manufacturing steps of the display assembly 100 may be simplified, and it is advantageous to improve production efficiency of the display assembly 100.

Figure 12D:
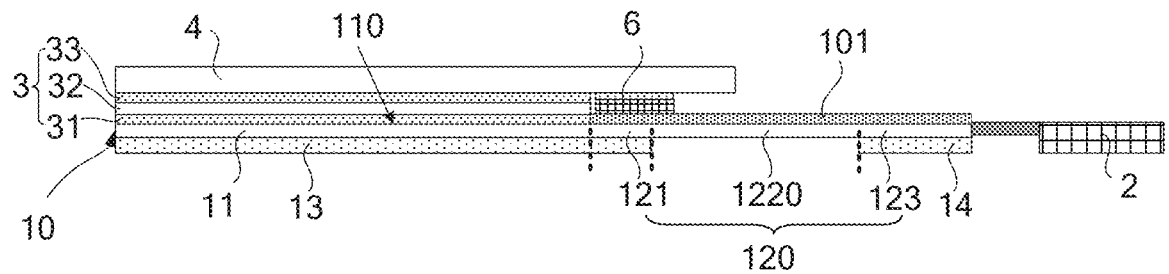
Figure 12E:
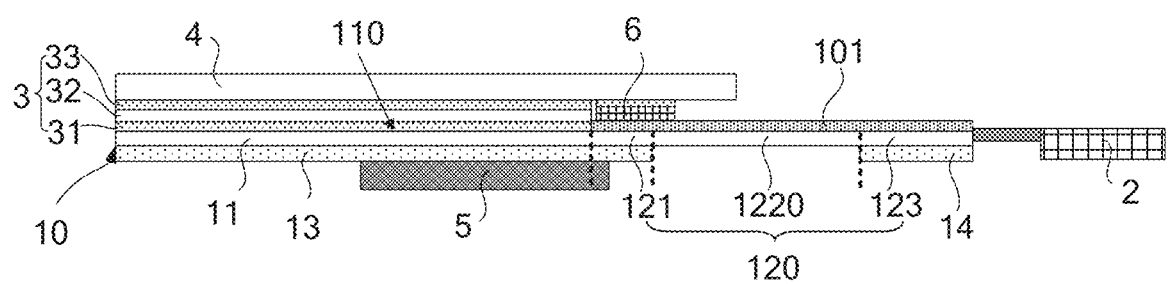

In step 5 (S5), as shown in FIG. 12E, a first support layer 5 is disposed at surfaces of the main portion 11 and the first straight sub-portion 121 facing away from the display surface 110 of the main portion 11.

For example, the first support layer 5 may be directly adhered to surfaces of the main portion 11 and the first straight sub-portion 121 facing away from the display surface 110 of the main portion 11.

For another example, as shown in FIG. 12E, in a case where the first backfilm 13 is disposed on the surfaces of the main portion 11 and the first straight sub-portion 121 facing away from the display surface 110, the first support layer 5 may be directly adhered to a surface of the first backfilm 13 away from the main portion 11 and the first straight sub-portion 121.

In some embodiments, in a case where the surface of the flexible display panel to be processed 10 facing away from the display surface 110 is covered with the lower backfilm 15, before S5, the method further includes step 5-1 (S5-1).

In S5-1, as shown in FIG. 12D, a portion, on the surface of the middle sub-portion 1220 of the bendable portion 120, of the lower backfilm 15 is removed, so that the lower backfilm 15 is cut into a first backfilm 13 covering the surfaces of the main portion 11 and the first straight sub-portion 121 and a second backfilm 14 covering the surface of the second straight sub-portion 123.

Herein, a method of removing the portion, on the surface of the middle sub-portion 1220 of the bendable portion 120, of the lower backfilm 15 is similar to the method of removing the upper backfilm 16, that is, the method may be removed by laser irradiation or chemical dissolution, which is not limited in the embodiments of the present disclosure.

Figure 12F:
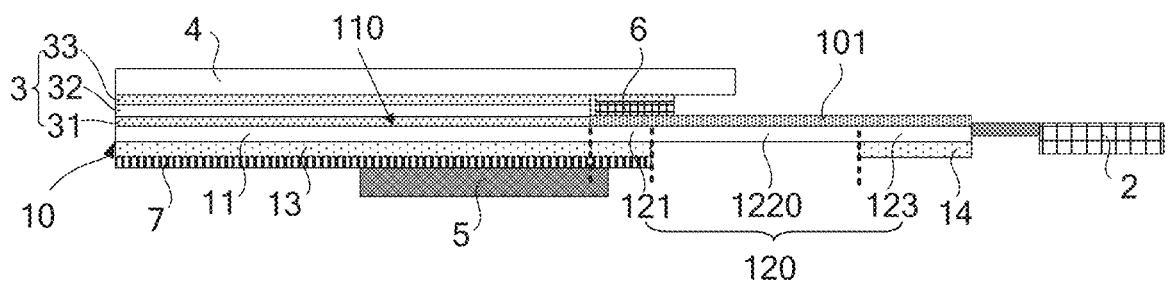
Figure 12G:
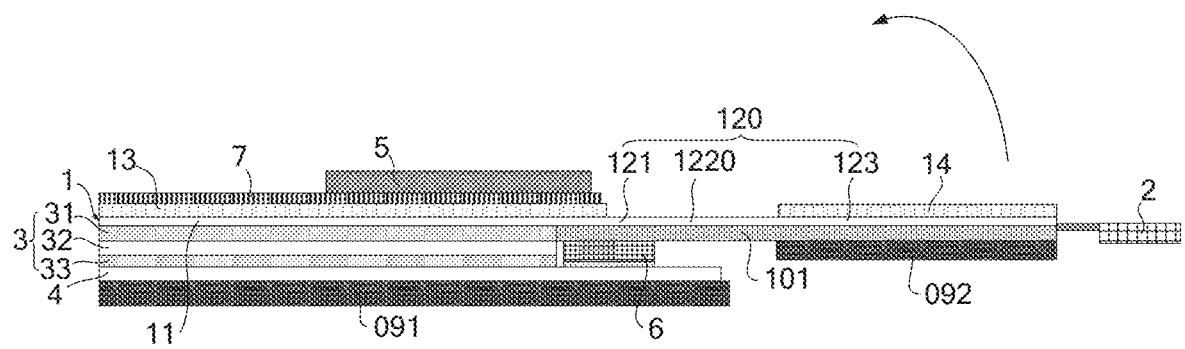
Figure 12H:
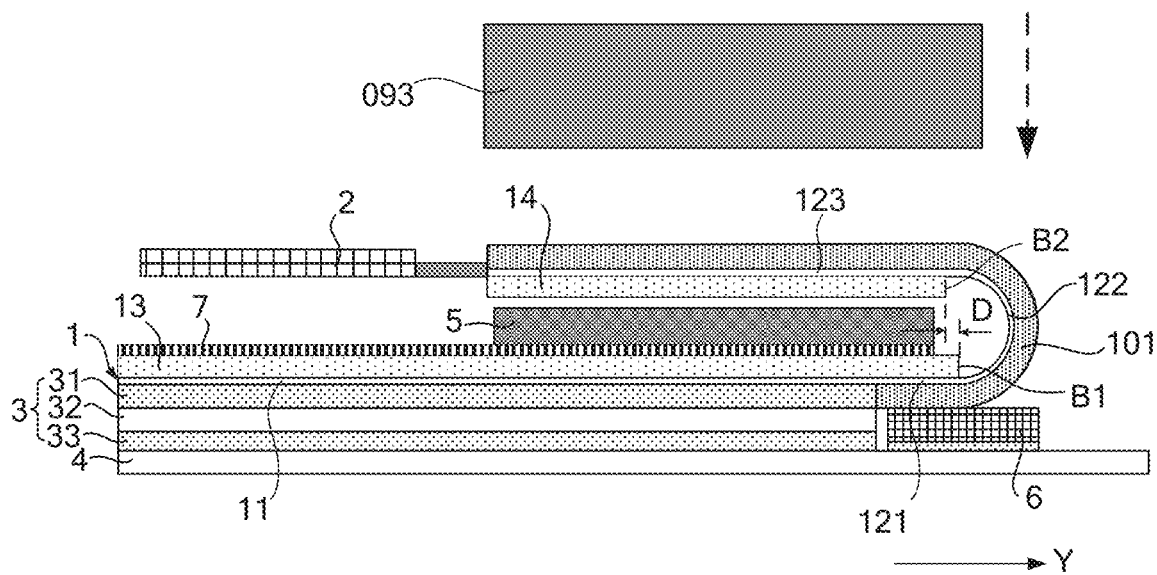

In step 6 (S6), as shown in FIG. 12H, the bendable portion 120 is bent toward the surface of the main portion 11 facing away from the display surface 110, so that the middle sub-portion 1220 forms an arched sub-portion 122, and the second straight sub-portion 123 is located at a surface of the main portion 11 facing away from the display surface 110, and is opposite to the first support layer 5.

Herein, the second straight sub-portion 123 being opposite to the first support layer 5 means that an orthogonal projection of the second straight sub-portion 123 on the flexible display panel to be processed 10 overlaps with an orthogonal projection of the first support layer 5 on the flexible display panel to be processed 10.

It will be noted that, before the bendable portion 120 is bent, the display assembly shown in FIG. 12E needs to be turned upside down to the structure shown in FIG. 12G. That is, the cover plate 4 is placed on a first stage 091, and the second straight sub-portion 123 of the bendable portion 120 is placed on a second stage 092, and then the second stage 092 moves upwards and is flipped relative to the first stage 091 (e.g., in the direction shown by the curved arrow in FIG. 12G), so that the middle sub-portion 1220 is transformed into the arched sub-portion 122 to achieve the bending of the bendable portion 120.

Figure 12I:
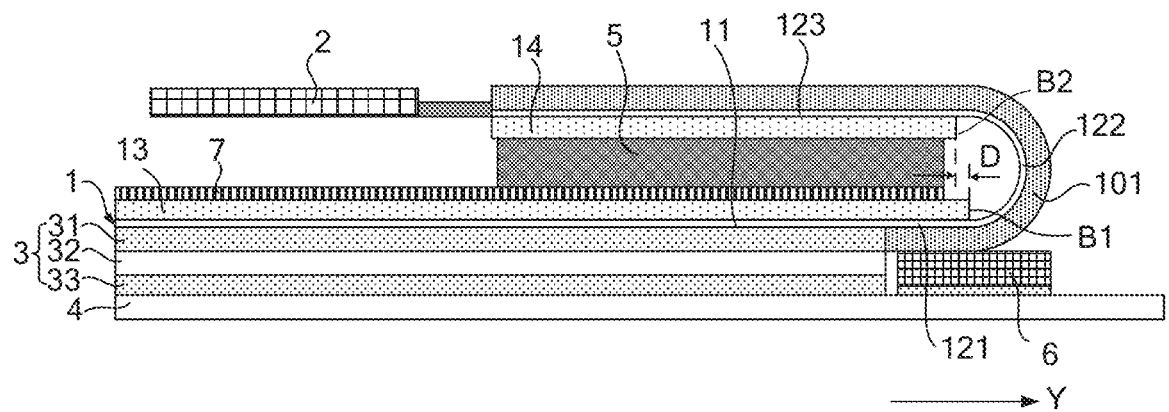

In step 7 (S7), as shown in FIGS. 12H and 12I, the second straight sub-portion 123 of the bendable portion 120 is pressed to the first support layer 5 through a pressing head 093 (e.g., in the direction shown by the dashed arrow in FIG. 12H), so that the second straight sub-portion 123 is connected to the first support layer 5.

In some examples, when the bendable portion 120 is bent toward the surface facing away from the display surface 110 of the main portion 11, so that the middle sub-portion 1220 forms an arched sub-portion 122, and the second straight sub-portion 123 is located above the surface of the main portion 11 facing away from the display surface 110 and is opposite to the first support layer 5, as shown in FIGS. 12G and 12H, the first backfilm 13 is closer to the arched sub-portion 122 than the second backing film 14 in the second direction Y from the first support layer 5 to the arched sub-portion 122, that is, an end of the bendable portion 120 away from the main portion 11 is pulled to the left side in FIGS. 12H and 12I by a certain distance (e.g., D), so that an edge B2 of the second backfilm 14 proximate to the arched sub-portion 122 and an edge B1 of the first backfilm 13 proximate to the arched sub-portion 122 are arranged staggered.

In this case, after alignment of the second backfilm 14 and the first support layer is completed, that is, the edge B1 of the first backfilm 13 proximate to the arched sub-portion 122 is closer to the arched sub-portion 122 than the edge B2 of the second backfilm 14, the second straight sub-portion 123 of the bendable portion 120 is vertically pressed to the first support layer 5 through the pressing head 093, the second backfilm 14 is adhered to the first support layer 5 due to the pressure of the pressing head 093. In this case, the flexible display panel to be processed 10 is formed as the flexible display panel 1 in FIGS. 4A, 4B, 8, and 12I.

For example, the first support layer 5 is a PET tape, and the second backfilm 14 may be adhered to the first support layer 5 through, for example, acrylic adhesive of the PET tape. For another example, before the pressing head 093 presses the second straight sub-portion 123, or before the bendable portion 120 is bent toward the surface of the main portion 11 facing away from the display surface 110, the surface of the first support layer 5 facing the second backfilm 14 or the surface of the second backfilm 14 may be coated with pressure-sensitive adhesive. In this way, the second backfilm 14 may be adhered to the first support layer through the pressure-sensitive adhesive.

In some embodiments, as shown in FIG. 12F, before S5, the method further includes step 8 (S8).

In S8, a third support layer 7 is disposed at the surface of the main portion 11 facing away from the display surface 110.

For example, the third support layer 7 may be disposed at the surface of the main portion 11 facing away from the display surface 110 by means of adhesive. For another example, the third support layer 7 may be fixed to the surface of the main portion 11 facing away from the display surface 110 by means of fasteners.

Based on this, the first support layer 5 is disposed on the surface of the third support layer 7 away from the main portion 11. For example, the first support layer 5 is a PET tape, and the first support layer 5 may be adhered to the third support layer 7 through, for example, acrylic adhesive in the surface of the PET tape.

In some embodiments, as shown in FIGS. 12B to 12G, the method further includes step 9 (S9).

In S9, a circuit board 2 is bonded to an end of the second straight sub-portion 123 of the flexible display panel 1 away from the main portion 11.

For example, pins on the circuit board 2 and pins on the end of the second straight sub-portion 123 away from the main portion 11 are connected through conductive adhesive, so as to achieve the bonding of the circuit board 2 and the flexible display panel 1.

It will be noted that, in the embodiments of the present disclosure, S9 may be performed first and then S1 to S5 may be performed; or, S1 to S5 may be performed first, and then S9 may be performed; or, S9 may be performed at the same time as any of the S1 to S5; or, S9 may be performed after S7 or S8.

In some embodiments, after S3, and before S4, the method further includes step 10 (S10) and step 11 (S11).

Figure 13A:
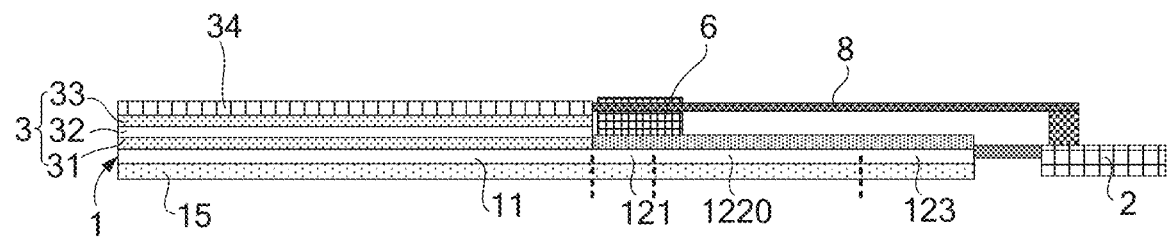
FIGS. 13A to 13C are schematic diagrams showing a manufacturing process of another display assembly, in accordance with some embodiments.

In S10, as shown in FIG. 13A, a touch function layer 34 is disposed above the display surface 110 of the main portion 11, that is, the touch function layer 34 is disposed above the second adhesive layer 33.

In S11, one end of the flexible circuit board 8 and a portion of the touch function layer 34 proximate to the bendable portion 120 are bonded together.

Figure 13B:
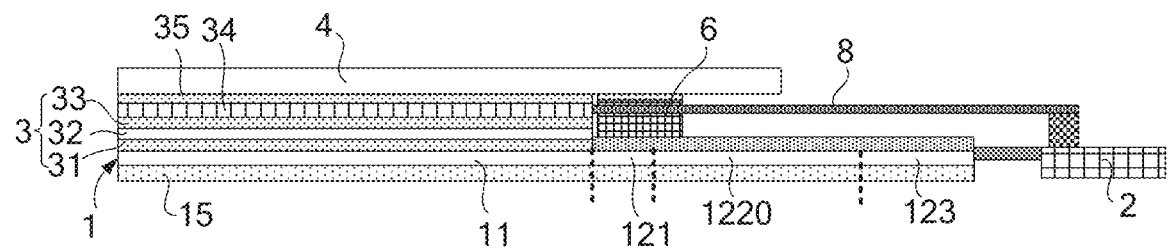

As shown in FIG. 13B, S4 is performed after S11. That is, a cover plate 4 is disposed on a side of the touch function layer 34 away from the main portion 11 and disposed on the surface of the second support layer 6 away from the first straight sub-portion 121.

For example, a third adhesive layer 35 is formed on a surface of the touch function layer 34 away from the main portion 11, so that the touch function layer 34 is adhered to the cover plate 4 through the third adhesive layer 35.

After S9, the method further includes step 12 (S12).

In S12, the other end of the flexible circuit board 8 and the circuit board 2 are bonded together.

For example, pins on the one end of the flexible circuit board 8 and pins on the end of the touch function layer 34 proximate to the bendable portion 120 are connected through the conductive adhesive, and pins on the other end of the flexible circuit board 8 and pins on the circuit board 2 are connected through the conductive adhesive, so that the bonding connections between the flexible circuit board 8 and the touch function layer 34 and between the flexible circuit board 8 and the circuit board 2 are achieved.

Based on this, it will be noted that, in the embodiments of the present disclosure, S2 may be performed first and then S11 may be performed, or S11 may be performed first and then S2 may be performed, or S2 and S11 may be performed at the same time, as long as the positions of the second support layer 6 and the flexible circuit board 8 do not interfere with each other are ensured. For example, the second support layer 6 may include two separate second support sub-layers 61 and 62. In a case where S11 is performed first and then S2 is performed, the second support sub-layers 61 and 62 may be arranged at both sides of the position of the flexible circuit board 8.

Figure 13C:
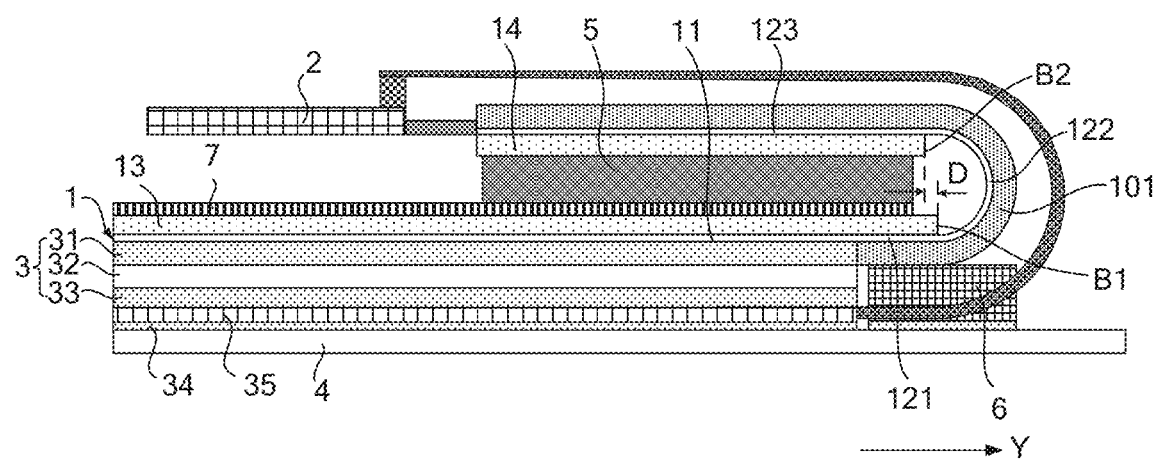

In this way, after S6 and S7 are completed, a display assembly as shown in FIG. 13C may be obtained.

The method of manufacturing the display assembly has the same beneficial effects as the display assembly described above, which details will not be repeated herein.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display assembly, comprising:
   a flexible display panel, including:
      a main portion with a display surface; and
      a bending portion bent toward a surface of the main portion facing away from the display surface; wherein the bending portion includes: a first straight sub-portion, an arched sub-portion, and a second straight sub-portion that are sequentially connected in an extending direction of the bending portion; the first straight sub-portion is further connected to the main portion, and the second straight sub-portion is located at the surface of the main portion facing away from the display surface;
   a cover plate disposed above the main portion and the first straight sub-portion;
   a first support layer located between the first straight sub-portion and the second straight sub-portion along a thickness direction of the display assembly, and between the main portion and the second straight sub-portion along the thickness direction of the display assembly, the first support layer being connected to the second straight sub-portion;
   a second support layer disposed between the first straight sub-portion and the cover plate; an orthogonal projection of the second support layer on the cover plate overlapping with an orthogonal projection of the first support layer on the cover plate, and the second support layer being configured to support the first straight sub-portion;
   a first backfilm disposed on surfaces of the main portion and the first straight sub-portion facing the first support layer; and
   a second backfilm disposed on a surface of the second straight sub-portion facing the first support layer, the first backfilm being closer to the arched sub-portion than the second backfilm in a direction from the first support layer to the arched sub-portion.

2. The display assembly according to claim 1, wherein the second support layer is connected to the cover plate and is in direct contact with the first straight sub-portion.

3. The display assembly according to claim 1, further comprising an adhesive layer disposed at least on a surface of the arched sub-portion facing away from the first support layer.

4. The display assembly according to claim 3, wherein the adhesive layer is further disposed on a surface of the first straight sub-portion facing the second support layer; wherein the second support layer is connected to the cover plate and is in direct contact with the adhesive layer.

5. The display assembly according to claim 1, wherein the second support layer is made of an elastic material or a rigid material.

6. The display assembly according to claim 5, wherein the second support layer is made of the elastic material including polyethylene terephthalate or rubber.

7. The display assembly according to claim 5, wherein the second support layer is made of the rigid material including metal.

8. The display assembly according to claim 1, wherein
   the arched sub-portion has surfaces perpendicular to a thickness thereof, and a first side surface and a second side surface connected to the surfaces and opposite to each other; and
   a dimension of the second support layer is approximately equal to a dimension of the bending portion in a direction from the first side surface to the second side surface.

9. The display assembly according to claim 1, wherein a distance between an orthogonal projection of an edge of the first backfilm proximate to the arched sub-portion on the cover plate and an orthogonal projection of an edge of the second backfilm proximate to the arched sub-portion on the cover plate is in a range of 30 μm to 90 μm.

10. The display assembly according to claim 1, wherein an orthogonal projection of an edge of the second backfilm proximate to the arched sub-portion on the cover plate is located within a range of an orthogonal projection of the second support layer on the cover plate.

11. The display assembly according to claim 1, further comprising a third support layer disposed at least between the main portion and the first support layer.

12. The display assembly according to claim 11, wherein the third support layer is made of metal.

13. The display assembly according to claim 1, further comprising an optical sheet group disposed between the main portion and the cover plate, a thickness of the optical sheet group being greater than or equal to a thickness of the second support layer.

14. The display assembly according to claim 1, further comprising:
   a circuit board connected to the second straight sub-portion and located on the surface of the main portion facing away from the display surface;
   a touch function layer disposed between the main portion and the cover plate; and
   a flexible circuit board; one end of the flexible circuit board being connected to a portion of the touch function layer proximate to the second support layer, and another end of the flexible circuit board being located at a side of the second straight sub-portion away from the main portion and being connected to the circuit board;
   wherein an orthogonal projection of the second support layer on a reference plane is non-overlapping with an orthogonal projection of the flexible circuit board on the reference plane, and the reference plane is a plane perpendicular to a plane where the main portion is located.

15. A display apparatus, comprising:
   a housing with an opening; and the display assembly according to claim 1, wherein the cover plate is disposed at the opening of the housing, and the flexible display panel is disposed in the housing.

16. A method of manufacturing a display assembly, the display assembly being the display assembly according to claim 1, the method comprising:
- providing a flexible display panel to be processed, the flexible display panel to be processed including the main portion and a bendable portion; wherein the bendable portion includes the first straight sub-portion, a middle sub-portion, and the second straight sub-portion that are sequentially connected, and the first straight sub-portion is further connected to the main portion;
- providing the second support layer on a surface of the first straight sub-portion directly connected to the display surface;
- providing the cover plate above the display surface and a surface of the second support layer facing away from the first straight sub-portion;
- providing the first support layer on surfaces of the main portion and the first straight sub-portion facing away from the display surface;
- bending the bendable portion toward the surface of the main portion facing away from the display surface, so that the middle sub-portion forming the arched sub-portion, and the second straight sub-portion is located on the surface of the main portion facing away from the display surface and opposite to the first support layer; and
- pressing the second straight sub-portion onto the first support layer, so that the second/straight sub-portion is connected to the first support layer;
- before bending the bendable portion toward the surface of the main portion facing away from the display surface, the method further comprising:
- providing a first backfilm on surfaces of the main portion and the first straight sub-portion facing the first support layer; and
- providing a second backfilm on a surface of the second straight sub-portion facing the first support layer;
- wherein the first backfilm is closer to the arched portion than the second backfilm in a direction from the first support layer to the arched portion after bending the bendable portion toward the surface of the main portion facing away from the display surface.

17. The method according to claim 16, before bending the bendable portion toward the surface of the main portion facing away from the display surface, the method further comprising:
- coating a surface of the middle sub-portion with adhesive to form an adhesive layer.

18. The method according to claim 16, before providing the first support layer on the surfaces of the main portion and the first straight sub-portion facing away from the display surface, the method further comprising:
- providing a third support layer at least at the surface of the main portion facing away from the display surface.

\* \* \* \* \*